United States Patent
Hull et al.

(10) Patent No.: US 10,704,740 B2
(45) Date of Patent: Jul. 7, 2020

(54) METHOD AND SYSTEM FOR SIMULATING A LEAK IN A PIPELINE, AND AN OUTLET FOR COUPLING A CONDUIT TO A PIPELINE

(71) Applicant: Hifi Engineering Inc., Calgary (CA)

(72) Inventors: John Hull, Calgary (CA); Seyed Ehsan Jalilian, Calgary (CA); Oleksiy Pletnyov, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 188 days.

(21) Appl. No.: 15/773,965

(22) PCT Filed: Nov. 3, 2016

(86) PCT No.: PCT/CA2016/051283
§ 371 (c)(1),
(2) Date: May 4, 2018

(87) PCT Pub. No.: WO2017/075712
PCT Pub. Date: May 11, 2017

(65) Prior Publication Data
US 2018/0320827 A1 Nov. 8, 2018

Related U.S. Application Data

(60) Provisional application No. 62/251,521, filed on Nov. 5, 2015.

(51) Int. Cl.
*F17D 5/02* (2006.01)
*G01M 3/28* (2006.01)

(52) U.S. Cl.
CPC ............. *F17D 5/02* (2013.01); *G01M 3/2815* (2013.01)

(58) Field of Classification Search
CPC ........... F17D 5/00; F17D 5/02; G01M 3/2815
See application file for complete search history.

(56) References Cited

U.S. PATENT DOCUMENTS 5,168,748 A * 12/1992 Flora, Jr. ............... G01M 3/007
73/1.05
5,675,506 A    10/1997 Savic
(Continued)

FOREIGN PATENT DOCUMENTS

CN    201884942 U  *  6/2011  .............. F77D 5/02
CN    102997059 A  *  3/2013  .............. F17D 5/02
(Continued)

OTHER PUBLICATIONS

International Search Report and Written Opinion of the International Searching Authority, dated Feb. 3, 2018, for corresponding International Application No. PCT/CA2016/051283, 9 pages.
(Continued)

*Primary Examiner* — Nguyen Q. Ha
(74) *Attorney, Agent, or Firm* — Klarquist Sparkman, LLP

(57) ABSTRACT

Various embodiments provide a method of simulating a leak in a pipeline. The method includes: receiving a fluid stream from a fluid supply; and outputting the received fluid stream through an outlet such that the received fluid stream hits an outer surface of the pipeline at a location opposite the outlet such that a vibration is caused in the pipeline. Some other embodiments provide a corresponding system for simulating a leak in a pipeline, and a corresponding outlet for coupling a conduit to a pipeline.

23 Claims, 10 Drawing Sheets

(56) References Cited

U.S. PATENT DOCUMENTS

2013/0215926 A1\* 8/2013 Belli ..................... G01K 11/32
374/4
2015/0276545 A1 10/2015 Takahashi et al.

FOREIGN PATENT DOCUMENTS

| CN | 103486443 A | \* | 1/2014 | ............... F17D 5/02 |
| JP | 59120838 A | \* | 7/1984 | ............ G01M 3/243 |
| KR | 20100050796 A | \* | 5/2010 | .............. G01M 3/00 |

OTHER PUBLICATIONS

Karkulali et al., "Leak Detection in Gas Distribution Pipelines using Acoustic Impact Monitoring" *Industrial Electronics Society*, IECON 2016—$42^{nd}$ Annual Conference of the IEEE, Oct. 23-26, 2016, 5 pages.

\* cited by examiner

METHOD AND SYSTEM FOR SIMULATING A LEAK IN A PIPELINE, AND AN OUTLET FOR COUPLING A CONDUIT TO A PIPELINE

CROSS REFERENCE TO RELATED APPLICATIONS

This is the U.S. National Stage of International Application No. PCT/CA2016/051283, filed Nov. 3, 2016, which in turn claims the benefit of and priority to U.S. Provisional Application No. 62/251,521, filed Nov. 5, 2015. The provisional application is incorporated herein in its entirety.

TECHNICAL FIELD

The present disclosure is directed methods, systems and techniques for simulating a leak in a pipeline, and an outlet for coupling a conduit to a pipeline. Specific embodiments relate to directing a fluid stream through an outlet at an outer surface of the pipeline to cause a vibration in the pipeline which simulates a leak in the pipeline.

BACKGROUND

It is known to transport substances in pipelines. For example, natural gas such as methane is transported in pipelines from its origin to areas of high natural gas demand. Leaks can occur in such pipelines. For example, welded joints between adjacent tubes of the pipeline can fail due to corrosion or falling objects. Accordingly, systems and methods exist to monitor the pipeline to detect when a leak occurs. Once a leak has been detected, the leak can be managed, for example, by shutting-off supply of the substance carried by the pipeline to reduce loss of the substance and potential environmental damage. Also, repair of the leak can be initiated.

SUMMARY

A first aspect provides a method of simulating a leak in a pipeline, the method comprising: (a) receiving a fluid stream from a fluid supply; and (b) outputting the received fluid stream through an outlet such that the received fluid stream hits an outer surface of the pipeline at a location opposite the outlet such that a vibration is caused in the pipeline.

In an embodiment, the method further comprises coupling the outlet to the outer surface of the pipeline prior to outputting the received fluid stream through the outlet.

In an embodiment, the method further comprises varying a pressure of the received fluid stream output through the outlet.

In an embodiment, the method further comprises: determining a flow rate of the received fluid stream output through the outlet; and generating an alarm based on the determined flow rate.

In an embodiment, the alarm is generated only if the determined flow rate is below a threshold flow rate.

In an embodiment, the method further comprises heating or cooling the received fluid stream to a preset temperature before outputting the received fluid stream through the outlet.

In an embodiment, the preset temperature is the temperature of a substance being transported inside the pipeline.

In an embodiment, the method further comprises: coupling a plurality of different outlets at different locations on the outer surface of the pipeline; and selecting one of the plurality of different outlets as the outlet through which the received fluid stream is output.

In an embodiment, the method further comprises: selecting at least two of the plurality of different outlets; and, simultaneously outputting the received fluid stream through the selected at least two outlets such that the received fluid stream hits the outer surface of the pipeline at locations opposite each of the at least two selected outlets such that multiple separate vibrations are caused in the pipeline.

A second aspect provides an outlet for coupling a fluid conduit to a pipeline, the outlet comprising: a body portion; a bore formed through the body portion, the bore having an upstream opening formed in a first surface of the body portion, and a downstream opening formed in a second surface of the body portion; and two grooves formed in the first surface of the body portion, one groove being positioned one side of the upstream opening and the other groove being positioned an opposing side of the upstream opening.

In an embodiment, the second surface of the body portion includes two protrusions extending from the second surface of the body portion, one protrusion being positioned one side of the downstream opening and the other protrusion being positioned an opposing side of the downstream opening.

In an embodiment, an upstream end portion of the bore has a larger diameter than a downstream end portion of the bore.

In an embodiment, the upstream end portion comprises an internal thread.

A third aspect provides a system for simulating a leak in a pipeline, the system comprising: a pipeline; a fluid supply operable to generate a fluid stream; an inlet in fluid communication with the fluid supply so as to receive the fluid stream therefrom; a control valve having a valve input, a valve output and a control port, the valve input being in fluid communication with the inlet so as to receive the fluid stream therefrom, the control valve being operable to selectively permit or prevent communication of the fluid stream from the valve input to the valve output based on a control signal received at the control port; a controller communicatively coupled to the control port and operable to provide the control signal to the control port; an outlet in fluid communication with the valve output, the outlet being fixed to the pipeline such that, when the control valve permits communication of the fluid stream from the valve input to the valve output, the fluid stream is output onto an outer surface of the pipeline such that a vibration is caused in the pipeline.

In an embodiment, the control valve is operable to vary an amount of the fluid stream which is permitted to communicate from the valve input to the valve output based on the control signal received at the control port.

In an embodiment, the controller comprises: a computer operable to generate an electronic control signal; a transducer having a transducer input, a transducer output and a control terminal, the control terminal being communicatively coupled to the computer so as to receive the electronic control signal therefrom, the transducer input being in fluid communication with the inlet so as to receive the fluid stream therefrom, the transducer being operable to vary a pressure of the fluid stream received at the transducer input based on the electronic control signal received at the control terminal to generate a fluid control signal and to output the fluid control signal from the transducer output; and wherein the control port is in fluid communication with the transducer output, and wherein the control valve is operable to vary the amount of the fluid stream which is permitted to communicate from the valve input to the valve output based on a variation in pressure of the fluid control signal received at the control port.

In an embodiment, the controller further comprises: a shutoff valve having a shutoff terminal communicatively coupled to the computer, the shutoff valve being in fluid communication with the transducer input and operable to selectively permit or prevent flow of the fluid stream to the transducer input based on an electronic control signal received at the shutoff terminal from the computer to selectively permit or prevent output of the fluid control signal from the transducer output, and wherein the control valve is operable to prevent communication of the fluid stream from the valve input to the valve output when the fluid control signal is absent at the control port.

In an embodiment, the system further comprises a first fluid pressure regulator in fluid communication with the inlet and the valve input, the first fluid pressure regulator being operable to limit a maximum pressure of the fluid stream received at the valve input.

In an embodiment, the system further comprises a second fluid pressure regulator in fluid communication with the inlet and the transducer input, the second fluid pressure regulator being operable to limit a maximum pressure of the fluid stream received at the transducer input.

In an embodiment, the system further comprises an input fluid pressure sensor communicatively coupled to the computer, the input fluid pressure sensor being in fluid communication with the inlet and the valve input, the input fluid pressure sensor being operable to measure a pressure of the fluid stream received at the valve input to generate an input pressure measurement and being further operable to supply the input pressure measurement to the computer.

In an embodiment, the system further comprises an output fluid pressure sensor communicatively coupled to the computer, the output fluid pressure sensor being in fluid communication with the valve output and the outlet, the output fluid pressure sensor being operable to measure a pressure of the fluid stream output from the valve output to generate an output pressure measurement and being further operable to supply the output pressure measurement to the computer.

In an embodiment, the computer is operable to vary the electronic control signal supplied to the control terminal based on the input pressure measurement and the output pressure measurement to cause the control valve to vary an amount of the fluid stream which is permitted to communicate from the valve input to the valve output such that the output pressure measurement is maintained at a preset value.

In an embodiment, the system further comprises a fluid flow meter communicatively coupled to the computer, the fluid flow meter being in fluid communication with the valve output and the outlet, the fluid flow meter being operable to measure a flow rate of the fluid stream output from the valve output to generate an output flow measurement and being further operable to supply the output flow measurement to the computer; and wherein the computer is operable to generate an alarm signal based on the output flow measurement.

In an embodiment, the system further comprises a fluid heating chamber communicatively coupled to the computer, the fluid heating chamber being in fluid communication with the inlet and the valve input; wherein the computer is operable to provide a heating control signal to the fluid heating chamber; and wherein the fluid heating chamber is operable to heat the fluid stream received at the valve input to a preset temperature based on the heating control signal received from the computer.

In an embodiment, the system further comprises a compressor in fluid communication with the inlet and communicatively coupled to the computer, wherein the computer is operable to provide a fluid generation control signal to the compressor; and wherein the compressor is operable to generate the fluid stream received by the inlet by compressing ambient air, based on the fluid generation control signal received from the computer.

In an embodiment, the computer comprises a wireless communication module operable to receive a communication signal from a remote device, the computer being operable to generate control signals based on the communication signal.

In an embodiment, the system further comprises a selection unit having a selection terminal communicatively coupled to the computer and an outlet valve in fluid communication with the valve output and the outlet; wherein the computer is operable to provide a selection control signal to the selection unit; and wherein the selection unit is operable to control the outlet valve to selectively permit or prevent flow of the fluid stream output from the valve output to the outlet based on the selection control signal received at the selection terminal from the computer.

In an embodiment, the selection unit further comprises a selection valve having the selection terminal, a selection input and a selection output, the selection input being in fluid communication with the inlet; wherein the outlet valve further comprises a control port in fluid communication with the selection output; wherein the selection valve is operable to selectively permit or prevent flow of the fluid stream from the inlet to the control port of the outlet valve based on the selection control signal received at the selection terminal from the computer; and wherein the outlet valve is operable to permit flow of the fluid stream from the valve output to the outlet only if the fluid stream is present at the control port of the outlet valve.

In an embodiment, the system further comprises an additional selection unit and an additional outlet; the additional selection unit having an additional selection terminal communicatively coupled to the computer, and an additional outlet valve in fluid communication with the valve output and the additional outlet, wherein the computer is operable to provide an additional selection control signal to the additional selection unit; wherein the additional selection unit is operable to control the additional outlet valve to selectively permit or prevent flow of the fluid stream from the valve output to the additional outlet based on the additional selection control signal received at the additional selection terminal from the computer; and wherein the additional outlet is fixed to the pipeline such that, when the additional outlet valve permits flow of the fluid stream from the valve output to the additional outlet, the fluid stream is output onto an outer surface of the pipeline such that a vibration is caused in the pipeline.

In an embodiment, the additional selection unit further comprises an additional selection valve having the additional selection terminal, an additional selection input and an additional selection output, the additional selection input being in fluid communication with the inlet; wherein the additional outlet valve further comprises a control port in fluid communication with the additional selection output; wherein the additional selection valve is operable to selectively permit or prevent flow of the fluid stream from the inlet to the control port of the additional outlet valve based on the additional selection control signal received at the additional selection terminal from the computer; and wherein the additional outlet valve is operable to permit flow of the fluid stream from the valve output to the additional outlet only if the fluid stream is present at the control port of the additional outlet valve.

In an embodiment, the outlet and the additional outlets are fixed to the pipeline at different locations.

In an embodiment, the outlet is an outlet according to the second aspect.

In an embodiment, the additional outlet is an outlet according to the second aspect.

In an embodiment, the outlet and the additional outlet both have downstream end portions, and wherein the downstream end portion of the outlet has a different diameter to the downstream end portion of the additional outlet.

BRIEF DESCRIPTION OF THE DRAWINGS

In the drawings, like reference characters generally refer to like parts throughout the different views. The drawings are not necessarily to scale, emphasis instead generally being placed upon illustrating the principles of some embodiments. In the following description, various embodiments are described with reference to the following drawings, in which:

FIGS. 5 to 7 are views of an outlet for coupling a conduit to a pipeline in accordance with an embodiment, wherein FIG. 5 is a perspective view, FIG. 6 is a plan view, and FIG. 7 is a cross-section view along line A-A of FIG. 6;

DETAILED DESCRIPTION

Figure 1:
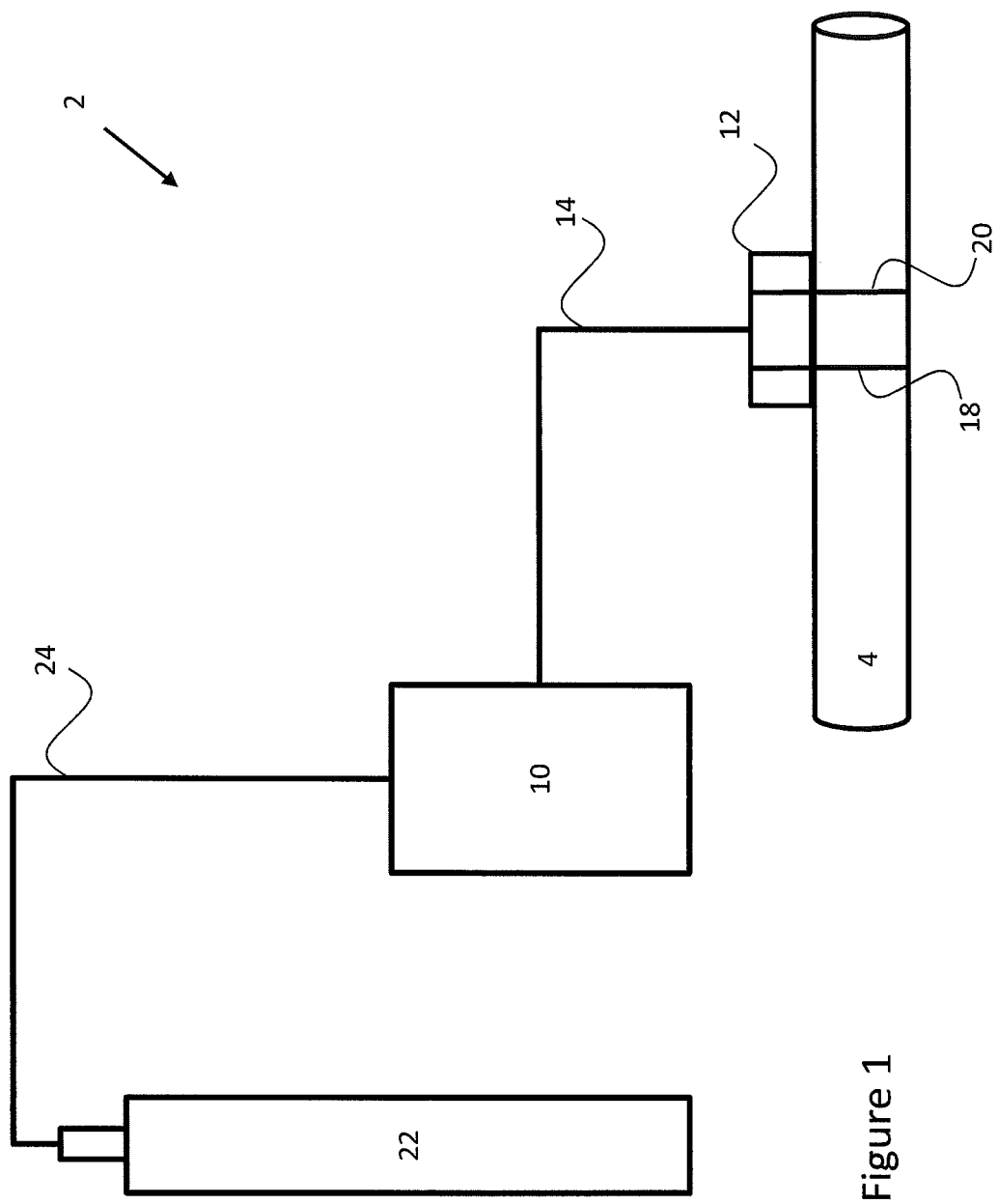
FIG. 1 is a schematic diagram of a system for simulating a leak in a pipeline in accordance with an embodiment.
Figure 2:
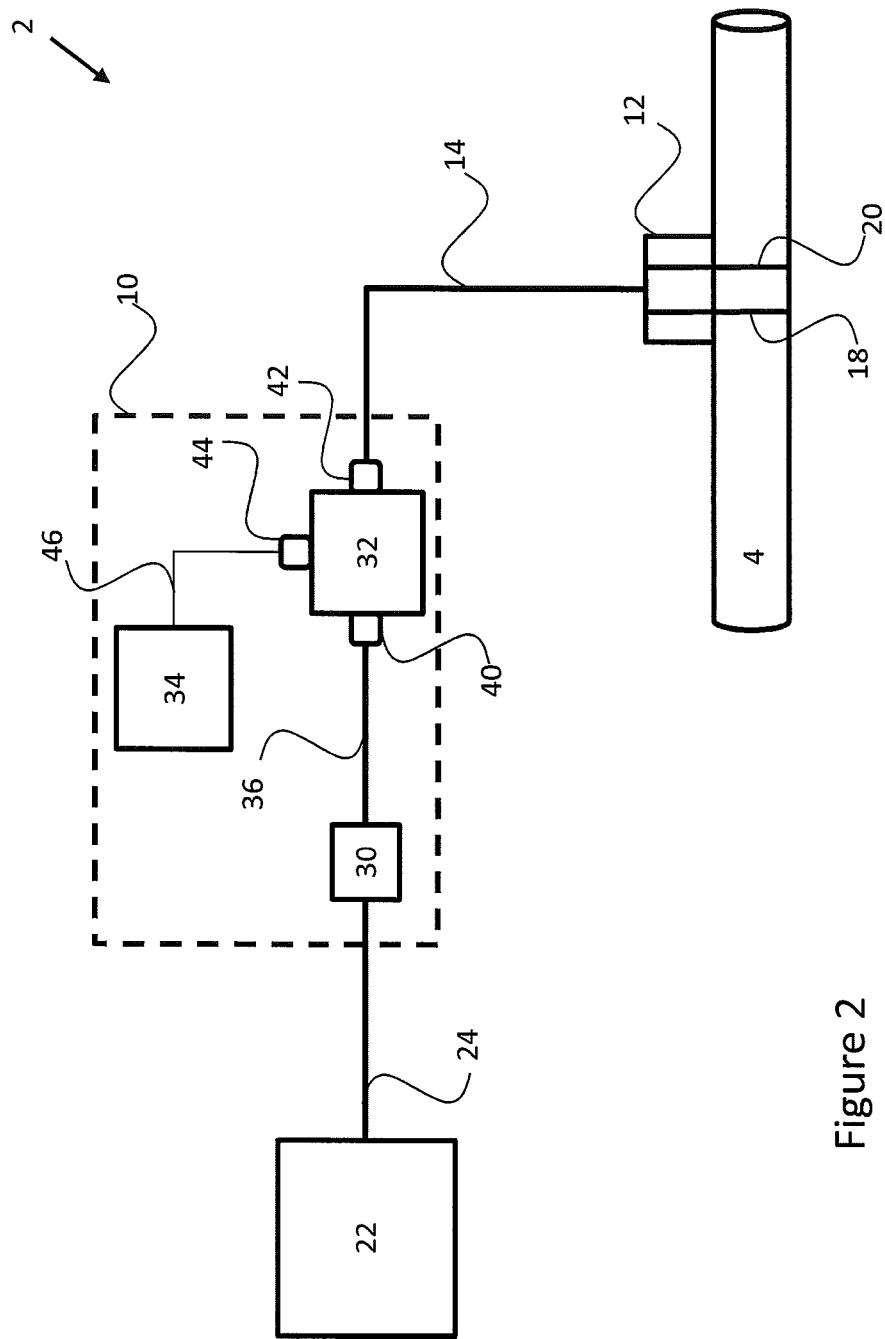
FIG. 2 is another schematic diagram of the system of FIG. 1 in which some internal components of a housing comprising part of the system of FIG. 1 are shown.

FIGS. 1 and 2 show a system 2 for simulating a leak in a pipeline 4 in accordance with an embodiment. Although FIGS. 1 and 2 show the pipeline 4 in a horizontal orientation, the pipeline 4 may be oriented in any direction, including vertically and at a grade between horizontal and vertical. Additionally, the pipeline 4 may be positioned above ground or below ground. In an embodiment, the pipeline 4 is a pipeline for transporting natural gas, such as methane, or other hydrocarbon products such as oil.

As shown in FIG. 1, the system 2 includes a main housing 10 and a outlet 12. The housing 10 is coupled to the outlet 12 by a conduit 14 and, as such, the housing 10 is in fluid communication with the outlet 12. The outlet 12 is fixed to an outer surface of the pipeline 4 by two straps 18 and 20. Specifically, the straps 18, 20 encircle both the outlet 12 and the pipeline 4, and the straps 18, 20 encircle sufficiently tightly to hold the outlet 12 against the outer surface of the pipeline 4.

In an embodiment, the housing 10 is also in fluid communication with a fluid supply 22 via a conduit 24. In an embodiment, the fluid supply 22 is a tank containing a fluid, for example, a gas such as nitrogen. In this way, the housing 10 may receive a fluid stream from the fluid supply 22 and communicate the received fluid stream to the outlet 12. The outlet 12 may be fixed to the pipeline 4 so as to direct the received fluid stream at the outer surface of the pipeline 4. Specifically, the outlet 12 may be orientated such that a fluid stream carried by the outlet 12 hits the outer surface of the pipeline 4 after exiting the outlet 12. The impact of the fluid stream on the outer surface of the pipeline 4 causes a vibration in the pipeline which mimics the vibration caused by a leak in the pipeline 4. Accordingly, the system 2 may be used to simulate a leak in the pipeline 4.

As shown in FIG. 2, in an embodiment, contained within the housing 10 is an inlet 30, a control valve 32 and a controller 34. The inlet 30 is in fluid communication with the control valve 32 via a conduit 36. Also, the inlet 30 is connected to the conduit 24 so as to be connected to, and in fluid communication with, the fluid supply 22. In this way, the inlet 30 can receive a fluid stream from the fluid supply 22 via the conduit 24.

In an embodiment, the control valve 32 has a valve input 40, a valve output 42 and a control port 44. The valve input 40 is connected to the conduit 36 so as to be in fluid communication with the inlet 30. In this way, the valve input 40 can receive a fluid stream from the inlet 30. The valve output 42 is connected to the conduit 14 so as to be in fluid communication with the outlet 12. In this way, the outlet 12 can receive a fluid stream from the valve output 42. The control port 44 is connected to the controller 34 via a connection 46. In this way, the control port 44 can receive a control signal from the controller 34.

In an embodiment, the control valve 32 is operable to selectively permit or prevent communication of the fluid stream from the valve input 40 to the valve output 42 based on a control signal received at the control port 44. For example, the control valve 32 may include a fluid passageway (not shown) and the valve input 40 may be in fluid communication with the valve output 42 via the fluid passageway. The fluid passageway may include an adjustable barrier which is actuatable between a closed state and an open state. In the closed state, the barrier may completely block the fluid passageway to prevent a fluid stream received by the valve input 40 from being output from the valve output 42 to the outlet 12. In the open state, the barrier may open the fluid passageway to permit a fluid stream received by the valve input 40 to be output from the valve output 42 to the outlet 12. Accordingly, the control valve 32 may control the adjustable barrier based on the control signal received from the controller 34 at the control port 44 to as to selectively permit or prevent the fluid stream being output from the valve output 42. However, it is to be understood that in some other embodiments, a different valve structure may be used. For example, an adjustable orifice may be used instead of an adjustable barrier.

In an embodiment, the controller 34 is operable to provide the control signal to the control port 44. In an embodiment, the controller 34 is a hydraulic controller which is operable to provide a fluid control signal to the control port 44. In this case, the control port 44 may be a fluid port and the connection 46 may be a fluid conduit. In an embodiment, a characteristic of the fluid control signal may control operation of the control valve 32, for example, open or close the control valve 32. The characteristic of the fluid control signal may include a fluid pressure or flow rate. However, in another embodiment, the controller 34 is an electronic controller which is operable to provide an electronic control signal to the control port 44. In this case, the control port 44 may be an electric terminal and the connection 46 may be an electrical wire or cable. Also, the controller 34 may include at least one processor and at least one memory including computer program code. The at least one memory and the computer program code may be configured to, with the at least one processor, cause the controller 34 to generate the electronic control signal. In an embodiment, the controller 34 may be a computer system as described below with reference to FIG. 10. In an embodiment, a characteristic of the electronic control signal may control operation of the control valve 32, for example, open or close the control valve 32. The characteristic of the electronic control signal may include a phase, amplitude, voltage or current.

In use, the operation of the system 2 may be as follows. A fluid stream is generated by the fluid supply 22 and transported via the conduit 24 to the inlet 30. The inlet 30 receives the fluid stream from the conduit 24 and transmits the fluid stream via the conduit 36 to the valve input 40. If the control valve 32 is closed, the fluid stream present at the valve input 40 is prevented from being communicated to the valve output 42. Accordingly, the fluid stream does not reach the conduit 14, the outlet 12 or the pipeline 4. On the other hand, if the control valve 32 is open, the fluid stream is permitted to communicate from the valve input 40 to the valve output 42. The fluid stream then flows from the valve output 42 via the conduit 14 to the outlet 12. The outlet 12 then directs the fluid stream at the outer surface of the pipeline 4 to cause a vibration in the pipeline 4. Whether the control valve 32 is open or closed depends on the control signal received at the control port 44 from the controller 34. For example, the control signal may include instructions which cause the control valve 32 to open or close. Additionally or alternatively, the instructions may specify a time period during which the control valve 32 should remain in the open or closed state. In an embodiment, the control valve 32 may be closed by default and then receive a control signal to open for a defined period, such as 10 seconds. In another embodiment, the control valve 32 may be closed by default, then receive a control signal to open indefinitely, and then receive a control signal return to the default closed state.

According to the above-described operation, when the control valve 32 is in a closed state, the fluid stream from the fluid supply 22 is prevented from impacting the outer surface of the pipeline 4. Alternatively, when the control valve 32 is open, the fluid stream from the fluid supply 22 is directed so as to impact the outer surface of the pipeline 4 and generate a vibration. Accordingly, the assembly 2 may be used to selectively direct a fluid stream at the outer surface of the pipeline 4, wherein selection is based on a control signal received by the control valve 32 from the controller 34.

In an embodiment, directing a fluid stream such that it impacts the outer surface of the pipeline 4 causes a vibration in the pipeline 4. This vibration may include an acoustic signal, being a vibration of a particular frequency. In any case, the vibration caused by the fluid stream mimics the vibration caused by a leak in the pipeline 4. For example, any leak in the pipeline 4 will produce a vibration, such as, a hiss from high pressurized gas seeping from the pipeline 4, or a bubbling sound from gas seeping from the pipeline 4 into liquid surrounding the pipeline 4. The vibrations caused by such acoustic signals resulting from the migration of fluid may be used as an identifier of a leak in the pipeline 4.

It is known to deploy fiber optic cables, acoustic sensor arrays and other sensing tools in a pipeline for detecting vibrations in pipelines and locating fluid leaks. These sensing tools operate by detecting the vibrations or a result of them. For example, the sensing tools may measure a strain of the pipeline which is caused by the vibrations resulting from the leak. The data obtained by these detection systems can be digitally processed by software algorithms to determine the origin of different vibrations, allowing the location of the leak to be pinpointed. For example, Hifi Engineering Inc.'s MiCro™ (aka LeakSonar™ sensory technology) tool provides an example means for detecting a leak in the pipeline 4.

In an embodiment, directing the fluid stream through the outlet 12 such that the fluid stream impacts the outer surface of the pipeline 4 causes a thermal change in the pipeline 4 at the point of impact and in the surrounding area. For example, the Joule-Thomson effect describes that the temperature of air, nitrogen, oxygen and some other gases reduces when they are forced through a valve. The control valve 32 and/or the outlet 12 may act as a valve in this way. Additionally, a leak in the pipeline 4 can also cause a thermal change in the pipeline 4. For example, the pipeline 4 may cool because a heated fluid is leaking out of the pipeline 4 into a cooler surrounding. Some leak detection tools detect such thermal changes using a fiber optic cable. For example, a temperature change causes a change in optical path length of the fiber optic cable and optical interferometry can be used to identify the location of the change in path length to identify the leak location. Therefore, the thermal change in the pipeline 4 generated by directing a fluid stream onto the pipeline 4 can be used to simulate the thermal change caused by a leak in the pipeline 4. In this way, a leak in the pipeline 4 can be simulated using a thermal change.

In an embodiment, therefore, the system 2 can be used to selectively direct a fluid stream at the outer surface of the pipeline 4 to cause a vibration and/or a thermal change in the pipeline 4 which mimics the vibration and/or the thermal change produced by a leak in the pipeline 4. In this way, a leak detection system installed in the pipeline 4 can be tested to confirm that it detects a leak when the system 2 directs a fluid stream at the pipeline 4. Furthermore, a leak detecting system installed in the pipeline 4 can be calibrated using the system 2. For example, the system 2 can be activated to direct a fluid stream at the outer surface of the pipeline 4 to generate a vibration and/or a thermal change which mimics a pipeline leak. Then, the sensitivity of the leak detection system can be adjusted so that it is sensitive enough to detect the generated vibration and/or thermal change but not too sensitive so as to also detect much smaller vibrations and/or thermal changes which are not associated with the leak and serve only to add unwanted noise to the detection process.

Figure 3:
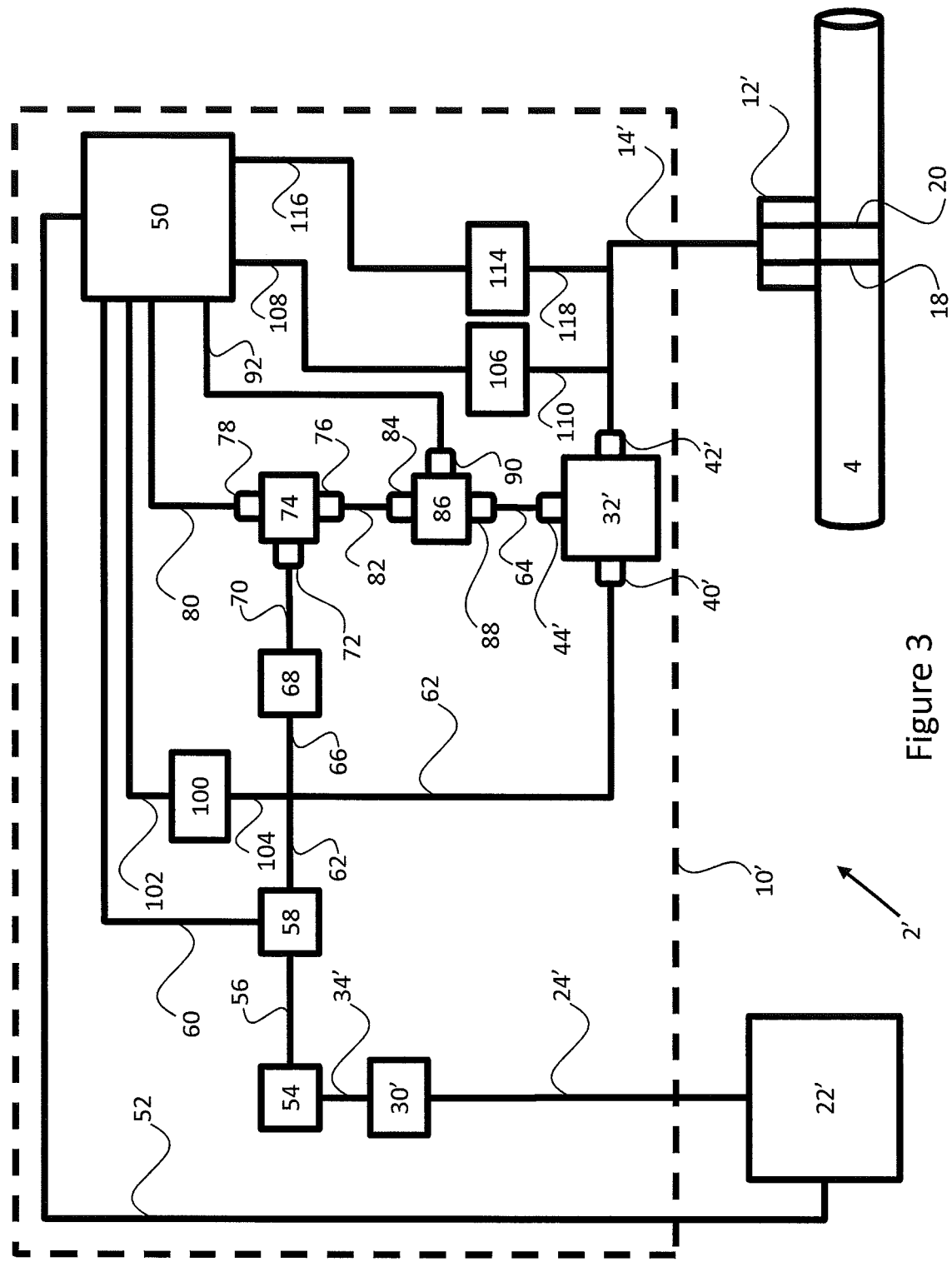
FIG. 3 is a schematic diagram of a system for simulating a leak in a pipeline in accordance with another embodiment.

The following provides a detailed description of a system 2' for simulating a leak in a pipeline in accordance with the embodiment of FIG. 3.

Some elements of the system 2' are analogous to elements of the system 2. For example, the system 2' includes a housing 10' connected to an outlet 12' via a conduit 14' such that the housing 10' is in fluid communication with the outlet 12'. Also, the outlet 12' is fixed to the outer surface of the pipeline 4 by straps 18' and 20'. Further, the system 2' includes a fluid supply 22' which is connected to an inlet 30' via a conduit 24'.

In an embodiment, the fluid supply 22' may be a compressor which is capable of compressing ambient air around it to generate a fluid stream. In this way, the fluid supply 22' is capable of generating a fluid stream and passing that generated fluid stream via the conduit 24' to the inlet 30'. In an embodiment, the compressor may be communicatively coupled, via an electric connection 52, to a computer 50 contained within the housing 10'. The computer 50 may provide a control signal (or fluid generation control signal) to the compressor which activates or deactivates operation of the compressor. In some embodiments, the compressor could be used to provide a liquid stream, such as a water stream. In an embodiment, the water may be pressurized by a gas, such as, nitrogen gas.

It is to be understood that in some other embodiments, the fluid supply 22' may be a tank containing a fluid, such as nitrogen, and the tank may be capable of providing nitrogen gas to the inlet 30' via the conduit 24'. In this way, the arrangement may be more similar to that of the embodiment of FIGS. 1 and 2.

Returning to the embodiment of FIG. 3, a conduit 34' is connected at one end to the inlet 30' and at the other end to a pressure regulator 54. Accordingly, an input of the pressure regulator 54 is in fluid communication with the inlet 30' so as to receive a fluid stream therefrom. An output of the pressure regulator 54 is connected to a conduit 56 which is connected to a fluid heating chamber 58. The pressure regulator 54 is operable to limit a maximum pressure of the fluid stream received from the inlet 30'. For example, a pressure of the fluid stream generated by the fluid supply 22' may be high enough to cause damage to the fluid heating chamber 58 and components downstream thereof. Therefore, the pressure regulator 54 may limit the pressure of the fluid stream such that it is always below a pressure which could cause damage to the fluid heating chamber 58 and components downstream thereof. In an embodiment, the pressure regulator 58 may regulate the pressure of the fluid stream to 2000 psi (13.8 MPa). That is, if the pressure is below this level it is unchanged but if the pressure is at or above this level, it is set to this level. In some other embodiments, the exact location of the pressure regulator 54 may vary provided that it is connected so as to regulate a pressure of the fluid stream received at the valve input 40'.

In an embodiment, the output of the pressure regulator 54 is connected to the fluid heating chamber 58 by the conduit 56. Additionally, the fluid heating chamber 58 is communicatively coupled to a computer 50 via an electrical connection 60. Further, the fluid heating chamber 58 is connected to a valve input 40' of a control valve 32' by a conduit 62 so that an output of the fluid heating chamber 50 is in fluid communication with the control valve 32'. In use, the fluid heating chamber 58 is operable to heat fluid received, via the pressure regulator 54, from the inlet 30' to a preset temperature based on a control signal (or heating control signal) received from the computer 50 and to provide a fluid stream heated to the preset temperature to the valve input 40'. In an embodiment, the computer 50 specifies the preset temperature in the control signal, and the fluid heating chamber 58 obtains the preset temperature from the control signal. In an embodiment, the fluid heating chamber 58 includes a reservoir (not shown) for collecting fluid received via the conduit 56. Additionally, the fluid heating chamber 58 may include a heating mechanism (not shown), such as a heating element, for heating fluid collected in the reservoir. The fluid heating chamber 58 may also include a temperature sensor (not shown) in the reservoir so that the fluid heating chamber 58 may control the heating mechanism to heat the fluid contained in the reservoir to the preset temperature. In any case, the fluid heating chamber 58 may heat the fluid stream received, via the pressure regulator 54, from the inlet 30' and provide a heated fluid stream to the control valve 32'. In this way, the fluid heating chamber 58 may be used to generate a thermal change in the pipeline 4 which mimics the thermal change generated by a leak in the pipeline so as to simulate a leak in the pipeline. In an embodiment, the fluid heating chamber 58 may be configured to cool or refrigerate the fluid stream.

It is to be understood that in some embodiments the fluid heating chamber 58 may be deactivated or omitted such that the fluid stream is communicated straight from the pressure regulator 54 to the control valve 32'. Also, in another embodiment, the position of the fluid heating chamber 58 and the pressure regulator 54 may be switched.

In an embodiment, the control valve 32' is analogous to the control valve 32 of FIGS. 1 and 2. Specifically, the control valve 32' has the valve input 40', a valve output 42', and a control port 44'. The valve input 40' may be in fluid communication with the valve output 42' via a fluid passageway having an adjustable barrier. The valve input 40' is connected to the conduit 62 so as to be in fluid communication with the fluid heating chamber 58. In this way, the valve input 40' can receive a heated fluid stream from the fluid heating chamber 58. The valve output 42' is connected to the conduit 14' so as to be in fluid communication with the outlet 12'. In this way, the outlet 12' can receive a heated fluid stream from the valve output 42'.

In an embodiment, the control valve 32' is operable to selectively permit or prevent communication of the fluid stream from the valve input 40' to the valve output 42' based on a control signal received at the control port 44'. In the embodiment of FIG. 3, the control port 44' is a fluid port and, as such, is configured to receive a fluid control signal. The control port 44' is connected to a conduit 64.

The above-described portions of FIG. 3 define a first flow path of the system 2'. According to this first flow path a fluid stream is generated by fluid supply 22' and provided to the control valve 32' via the inlet 30', the pressure regulator 54 and the fluid heating chamber 58. The control valve 32' is operable to selectively permit or prevent communication of the fluid stream from the valve input 40' to the valve output 42' based on a control signal received at the control port 44'. In the event that the fluid stream is communicated to the valve output 42', the fluid stream is then provided to the outlet 12' which directs the fluid stream such that it hits the outer surface of the pipeline 4. In this way, a vibration and/or thermal change may be generated in the pipeline 4 to simulate a leak.

The following description describes a second flow path of the system 2'. The purpose of the second flow path is to generate a fluid control signal for the control port 44' of the control valve 32'.

The second flow path originates from a junction in the conduit 62 which connects to the output of the fluid heating chamber 58. Specifically, a conduit 66 branches off of the conduit 62 at the junction. The other end of the conduit 66 is connected to a second pressure regulator 68. The conduits 62 and 66 provide a fluid connection between the output of the fluid heating chamber 58 and an input of the pressure regulator 68. An output of the pressure regulator 68 is connected to a conduit 70 which is connected to an input 72 of a shutoff valve 74. In this way, the pressure regulator 68 is in fluid communication with the shutoff valve 74. The pressure regulator 68 is operable to limit a maximum pressure of the fluid stream received from the fluid heating chamber 58. For example, a pressure of the fluid stream passed by the fluid heating chamber 58 may be high enough to cause damage to the shutoff valve 72 or components downstream thereof. Therefore, the pressure regulator 68 may limit the pressure of the fluid stream such that it is always below a pressure which could cause damage to the shutoff valve 72 or components downstream thereof. In an embodiment, the pressure regulator 68 may regulate the pressure of the fluid stream to 35 psi (241 KPa). That is, if the pressure is below this level it is unchanged but if the pressure is at or above this level, it is set to this level.

In an embodiment, the pressure regulator 68 is in fluid communication with the shutoff valve 74 via the conduit 70. The shutoff valve 74 includes the input 72, an output 76 and a shutoff terminal 78. The shutoff terminal 78 is connected to the computer 50 via an electrical connection 80. In this way, the shutoff valve 74 can receive an electric control signal from the computer 50. The output 76 of the shutoff valve 74 is connected to a conduit 82 which is connected at the other end to a transducer input 84 of a transducer 86. In an embodiment, the shutoff valve 74 is operable to selectively permit or prevent flow of the fluid stream from the pressure regulator 68 to the transducer input 84 based on an electronic control signal received at the shutoff terminal 78 from the computer 50. In an embodiment, the shutoff valve may be a solenoid valve.

In an embodiment, the transducer 86 is in fluid communication with the shutoff valve 74 via the conduit 82. The transducer 86 includes the transducer input 84, a transducer output 88 and a control terminal 90. The control terminal 90 is connected to the computer 50 via an electrical connection 92. In this way, the transducer 86 can receive an electrical control signal from the computer 50. The transducer output 88 is connected to the conduit 64 which connects to the control port 44' of the control valve 32', as mentioned above. This connection to the control valve 32' completes the second flow path of the system 2'. In an embodiment, the transducer 86 is operable to vary a pressure of the fluid stream received at the transducer input 84 from the shutoff valve 74 based on the electronic control signal received at the control terminal 90 from the computer 50. In an embodiment, the transducer may be a current to pressure (I/P) transducer that converts the electrical current of the electronic control signal to pressure. For example, an electrical current in the 4-20 mA range may be converted into a pressure in the 3-15 psi (20-100 KPa) or 6-30 psi (41-207 KPa) range, depending on the transducer model. In this way, the transducer 86 generates a fluid control signal and outputs the fluid control signal from the transducer output 88. Since the transducer output 88 is in fluid communication with the control port 44', the fluid control signal is provided to the control port 44' of the control valve 32'.

In some other embodiments, the exact location of the pressure regulator 68 may vary provided that it is connected so as to regulate a pressure of the fluid stream received by the shutoff valve 74 and/or the transducer 86.

In view of the above, the second flow path may be summarized as follows. The pressure regulator 68 receives the fluid stream from the fluid heating chamber 58 and regulates the pressure of the fluid stream, for example, to 35 psi (241 KPa). The fluid stream is then fed into the shutoff valve 74. The shutoff valve 74 either permits or prevents the fluid stream from being communicated to the transducer 86 based on an electronic control signal received by the shutoff valve 74 from the computer 50. If the shutoff valve 74 permits communication of the fluid stream to the transducer 86, a pressure of the fluid stream is controlled or varied by the transducer 86 based on an electronic control signal received by the transducer 86 from the computer 50. The fluid stream having the controlled or varied pressure is then fed into the control port 44' of the control valve 32'. As mentioned above with reference to the first flow path, the control valve 32' is operable to selectively permit or prevent communication of the fluid stream from the valve input 40' to the valve output 42', and onto the outlet 12', based on the fluid control signal received at the control port 44'.

In an embodiment, the control valve 32' is operable to prevent communication of the fluid stream from the valve input 40' to the valve output 42' when the fluid control signal is absent at the control port 44'. Therefore, in the event that the shutoff valve 74 prevents communication of the fluid stream to the transducer 86, no fluid control signal will be present at the control port 44' and, as such, the control valve 32' will close. Accordingly, the shutoff valve 74 provides the computer 50 with a mechanism for preventing output of the fluid stream from the outlet 12'.

In an embodiment, the control valve 32' is operable to vary an amount of the fluid stream which is permitted to communicate from the valve input 40' to the valve output 42' based on the control signal received at the control port 44'. Specifically, a specific pressure of the fluid control signal received at the control port 44' may cause the control valve 32' to permit a specific amount of the fluid stream to communicate from the valve input 40' to the valve output 42'. Additionally, a specific variation in pressure of the fluid control signal received at the control port 44' may cause a specific variation in an amount of the fluid stream which is communicated from the valve input 40' to the valve output 42'. Accordingly, the transducer 86 provides the computer 50 with a mechanism for varying an amount of the fluid stream which is output from the outlet 12'. Furthermore, the transducer 86 provides the computer 50 with a mechanism for varying a pressure of the fluid stream which is output from the outlet 12'. In this way, the system 2' may be adjustable.

In an embodiment, it is to be understood that the computer 50, the shutoff valve 74 and the transducer 86 together with their associated connections provide a controller which is analogous to the controller 34 of FIGS. 1 and 2.

In an embodiment, the system 2' further includes an input fluid pressure sensor 100 which is connected to the computer 50 via a electrical connection 102. The input fluid pressure sensor 100 is connected to the junction between conduits 62 and 64 by a further conduit 104. As such, the input fluid pressure sensor 100 is in fluid communication with the fluid heating chamber 58, the valve input 40' and the pressure regulator 68. The input fluid pressure sensor 100 is operable to measure a pressure of the fluid stream received at the valve input 40' and, based on this measurement, generate an input pressure measurement. The input fluid pressure sensor 100 is further operable to supply the input pressure measurement to the computer 50. In some other embodiments, the exact location of the input fluid pressure sensor 100 may vary provided that it is connected so as to provide an accurate measure of the pressure of the fluid stream received at the valve input 40'.

In an embodiment, the system 2' further includes an output fluid pressure sensor 106 which is connected to the computer 50 via a electrical connection 108. The output fluid pressure sensor 106 is connected to the conduit 14' by a further conduit 110. As such, the output fluid pressure sensor 106 is in fluid communication with the valve output 42' and the outlet 12'. The output fluid pressure sensor 106 is operable to measure a pressure of the fluid stream output from the outlet 12' and, based on this measurement, generate an output pressure measurement. The output fluid pressure sensor 106 is further operable to supply the output pressure measurement to the computer 50. In some other embodiments, the exact location of the output fluid pressure sensor 106 may vary provided that it is connected so as to provide an accurate measure of the pressure of the fluid stream sent to the outlet 12'.

In an embodiment, the computer 50 is operable to vary the electronic control signal supplied to the control terminal 90 based on the input pressure measurement and the output pressure measurement. In this way, the computer 50 may cause the control valve 32' to vary an amount of the fluid stream which is permitted to communicate from the valve input 40' to the valve output 42' such that the output pressure measurement is maintained at a constant or preset value. It is to be understood that the computer 50 achieves this by providing an electronic control signal to the transducer 86 to cause the transducer 86 to generate a fluid control signal which controls the control valve 32' to permit communication of an amount of the fluid stream to generate the desired pressure. In an embodiment, the computer 50 may include or may operate as a proportional-integral-derivative (PID) controller. In this way, a control loop feedback mechanism may be used to continuously calculate an error between a desired pressure and the pressure measured by the output pressure sensor 106. Using the input pressure measurement provided by the input pressure sensor 100, the computer 50 can generate an electronic control signal for the transducer 86 which controls the control valve 32' so as to vary an amount of the fluid stream communicated between the valve input 40' and the valve output 42' so as to reduce the error. In this way, the pressure of the fluid stream output from the outlet 12' may be maintained at a desired value.

In an embodiment, a fluid flow meter 114 is connected to the computer 50 by an electrical connection 116. Also, the fluid flow meter 114 is connected to the conduit 14' via a further conduit 118. In this way, the fluid flow meter 114 is in fluid communication with the valve output 42' and the outlet 12'. In an embodiment, the fluid flow meter 114 is operable to measure a flow rate of the fluid stream output from the valve output 42' and, based on this measurement, generate an output flow measurement. The fluid flow meter 114 may be further operable to supply the output flow measurement to the computer 50. In some other embodiments, the exact location of the fluid flow meter 114 may vary provided that it is connected so as to provide an accurate measure of the flow rate of the fluid stream send to the outlet 12'.

In an embodiment, the fluid flow meter 114 may be used by the computer 50 to confirm that the system 2' is operating. For example, an element of the system 2' may malfunction such that no fluid stream is output from the outlet 12' despite the computer 50 issuing control signals to the various elements of system 2' such that a fluid stream should be output from the outlet 12'. In this case, the computer 50 and a human operator of the system 2' may be unaware that that no fluid stream is being output from the outlet 12'. However, in the event of such a fault, the output flow measurement received by the computer 50 would indicate a zero or minimal flow and, as such, the computer 50 and its human operator could identify the fault. In an embodiment, the computer 50 is operable to generate an alarm signal based on the output flow measurement to notify a user of a malfunction.

In an embodiment, the computer 50 may be a computer system as described below with reference to FIG. 10. Based on the above, it is to be understood that the computer 50 may generate and send a control signal to a compressor acting as the fluid supply 22' which instructs the compressor to generate a fluid stream for provision to the inlet 30'. Also, the computer 50 may generate and send a control signal to the fluid heating chamber 58 which instructs the fluid heating chamber 58 to heat to a preset temperature the fluid stream received from the pressure regulator 54. Additionally, computer 50 may generate and send a control signal to the shutoff valve 74 to instruct the shutoff valve 74 to permit or prevent output of fluid from the outlet 12'. Further, the computer 50 may generate and send a control signal to the transducer 86 to instruct the transducer 86 to control the pressure of the fluid stream to cause a variation in the pressure of the fluid stream output from the outlet 12'. It is to be understood that the computer 50 may perform these operations in response to computer program code stored by the computer 50 and that, when executed, causes the computer 50 to perform these operations. Additionally or alternatively, the computer 50 may perform one or more of these operations in response to an input received from a human operator or another electronic device. In an embodiment, the input may be received via an input device (such as a keyboard) coupled to the computer 50. Also, the input may be received via a wireless communication module (such as a modem) coupled to the computer 50.

In an embodiment, the computer 50 may receive an input specifying a present temperature to which the fluid heating chamber 58 is to heat the fluid stream. This input may be a signal received from another electronic device. For example, the preset temperature may be provided by a temperature sensor (not shown) inside the pipeline 4 which measures a temperature of the substance being transported by the pipeline 4. In this way, the fluid stream directed onto the pipeline 4 by the outlet 12' may be heated to the same temperature as the substance inside the pipeline 4. In another embodiment, a human user may determine the temperature of the substance being transported by the pipeline 4 manually or via the temperature sensor, and then provide an input specifying this temperature to the computer 50.

In an embodiment, the computer 50 may be configured to connect to a remote device via a computer network, such as the internet. As such, the computer 50 may be capable of receiving instructions from a website. A human user of the system 2' may login to the website and configure a series of operations to be performed by the system 2'. For example, the operations may include outputting a fluid stream at the pipeline 4 for a period of 10 seconds. Once the operations are entered into the website, the human user may select a submit button on the website. This may cause the website to issue a series of instructions to the computer 50 which cause the computer 50 to control the system 2' to execute the operations defined by the user, in this case, to output a fluid stream at the pipeline 4 for a period of 10 seconds. The computer 50 may receive these instructions via the above-mentioned wireless communication module. For instance, the system 2' may have a default dormant state or sleep mode in which the only operation performed by the system 2' is that the wireless communication module of the computer 50 checks to see if any instructions have been received. This check may be performed periodically, for example, once every 10 seconds or 5 minutes. If no new instructions are received, the system 2' remains in the sleep mode and continues periodically checking for new instructions. On the other hand, if the wireless communication module identifies a new instruction, the instruction is executed. In this case, the computer 50 controls the system 2' to execute the operations defined by the user, in this case, to output a fluid stream at the pipeline 4 for a period of 10 seconds. Once this instruction is complete, the system 2' will reenter the sleep mode. In this way, the computer 50 and the system 2' may be controlled or operated remotely via a website. Accordingly, the system 2' may be installed on a pipeline 4 in a remote location and the system 2' may be activated remotely to simulate a leak in the pipeline 4 at the remote location.

In an embodiment, the computer 50 may be configured to transmit communication signals to remote devices via the wireless communication module of the computer 50. For example, the input pressure measurement, the output pressure measurement and the output flow measurement may be transmitted by the computer 50 to a remote device via the wireless communication module. In an embodiment, the remote device may upload the data onto the aforementioned website. In this way, the user may be able to look at the website and confirm that the system 2' is operating as instructed.

Figure 10:
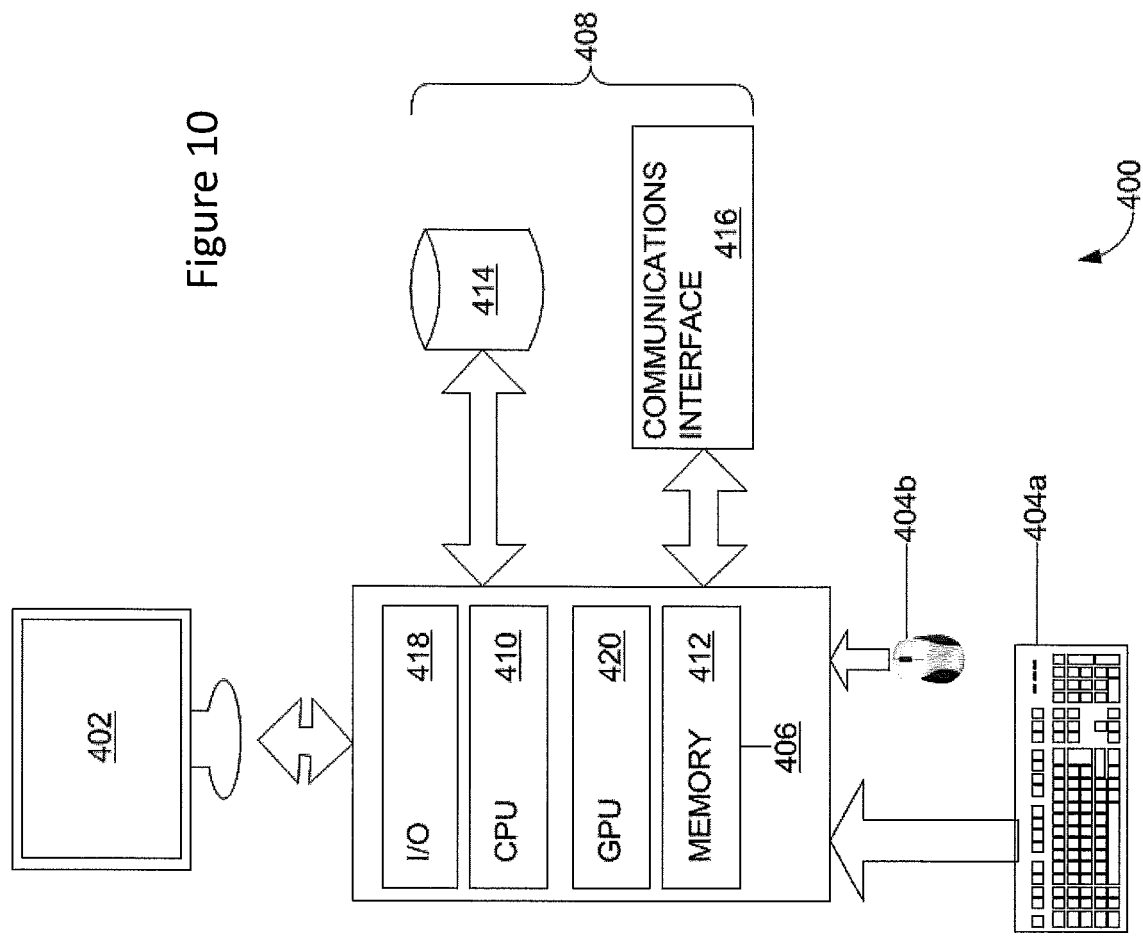
FIG. 10 is a block diagram of an illustrative computer system for use in some embodiments.

It is to be understood that whilst the computer 50 may be provided by the computer system of FIG. 10, a more simplified version may be used in some embodiments. For example, the computer 50 may include only a programmable logic controller (PLC) connected to the wireless communications module. In this way, the PLC may issue control signals to the various elements of the system 2' as mentioned above based on communication signals received from a remote device via the wireless communication module. These communication signals may still be sent via a website, as described above. An advantage of a simplified structure is that it can have low power consumption, for example, 12V DC. Therefore, it is possible to operate the system 2' using a renewable power source (not shown) electrically coupled to a rechargeable battery (not shown). For example, a wind turbine, a solar panel or solar panel array may be used to charge a battery from wind or solar energy and the battery can be used to provide power to the computer 50, the compressor (if present), the fluid heating chamber 28 (if present), the input pressure sensor 100, the output pressure sensor 106 and the fluid flow meter 114 (if present). Other components of the system 2' may not require electrical power to operate.

Figure 4:
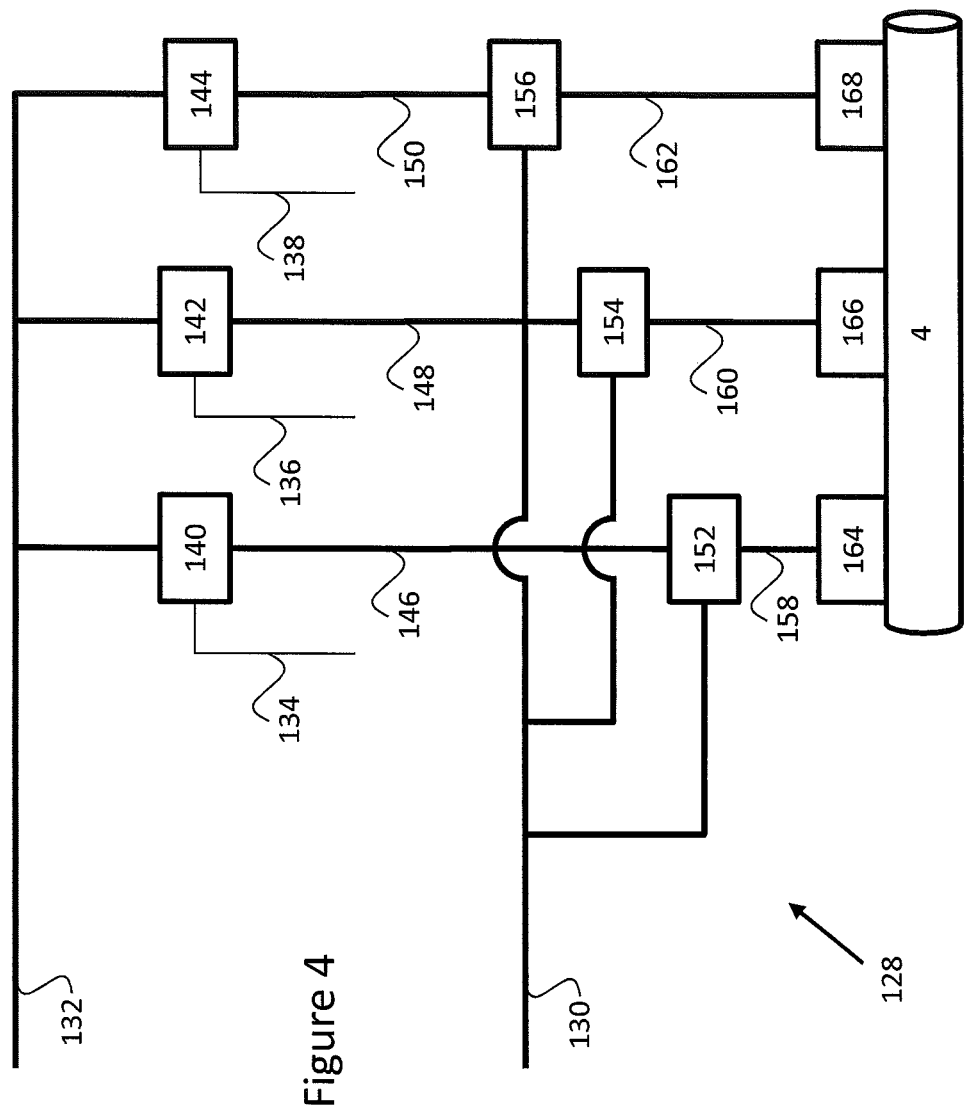
FIG. 4 is an expansion module of a system for simulating a leak in a pipeline in accordance with a further embodiment.
Figure 5:
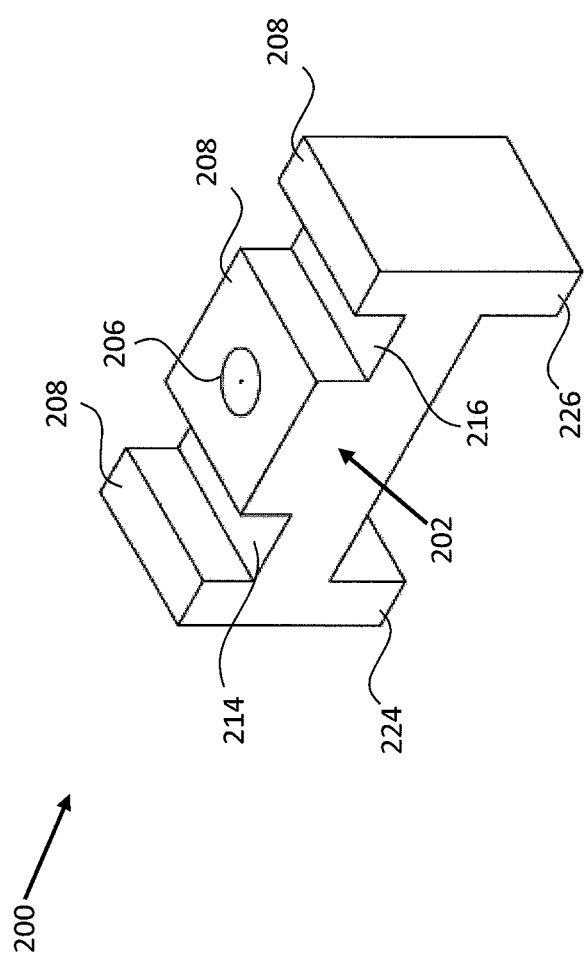

FIG. 4 shows an expansion module 128 for use with the above-described system 2' of FIG. 3. The following describes how the expansion module 128 is fitted into the system 2' in accordance with an embodiment.

In an embodiment, in the system 2', the outlet 12' is removed from the conduit 14'. Next, a fluid conduit 130 of the expansion module 128 is connected to the conduit 14'. Additionally, a fluid conduit 132 of the expansion module 128 is connected to the conduit 70 of system 2'. Further, electrical connections 134, 136 and 138 of the expansion module 128 are connected to the computer 50 of the system 2'. In this way, the expansion module 128 may be fitted to the system 2'.

The operation of the embodiment of the system 2' is as described above; however, in the present embodiment, the fluid stream output by the system 2' from the valve output 42' is communicated to the conduit 130 rather than the outlet 12'. The following describes the structure and operation of the expansion module 128.

In an embodiment, when the system 2' is operated to communicate a fluid stream into conduit 14', the fluid stream is received into the conduit 130. Likewise, when the system 2' is operated to communicate a fluid stream into conduit 70, the fluid stream is received into the conduit 132. In an embodiment, the fluid in conduit 132 may be a fluid control signal. The conduit 132 branches into three separate fluid paths and connects to an input of each of three separate selection valves 140, 142 and 144. An output of each of the three selection valves 140, 142 and 144 is connected to conduits 146, 148 and 150, respectively. Additionally, each of the selection valves 140, 142 and 144 is separately connected to the computer 50 of system 2' via the conduits 134, 136 and 138, respectively. In this way, each of the selection valves 140, 142 and 144 can receive an electronic control signal from the computer 50.

In use, each selection valve 140, 142 and 144 is operable to selectively permit or prevent communication of a fluid stream in conduit 132 to a respective one of the conduits 146, 148 and 150 based on an electronic control signal (or selection control signal) received from the computer 50 at a respective one of the connections 134, 136 and 138. For example, the selection valve 140 is operable to permit or prevent communication of a fluid stream from the conduit 132 to the conduit 146 based on an electronic control signal received from the computer 50 via the conduit 134. In this way, the selection valves 140, 142 and 144 may be operated to selectively communicate a fluid supply in conduit 132 into one or more of the conduits 146, 148 and 150. In an embodiment, each selection valve 140, 142 and 144 is a solenoid valve.

In an embodiment, the expansion module 128 includes outlet valves 152, 154 and 156. Each of the conduits 146, 148 and 150 is connected to a control port of a different one of the outlet valves 152, 154 and 156. For example, the conduit 146 is connected to the control port of the outlet valve 152. An input of each of the outlet valves 152, 154 and 156 is connected to the conduit 130. An output of each of the outlet valves 152, 154 and 156 is connected to a different one of conduits 158, 160 and 162. For example, the output of outlet valve 152 is connected to the conduit 158. In turn, each of the conduits 158, 160 and 162 is connected to a different one of outlets 164, 166 and 168. For example, the conduit 152 is connected to the outlet 164.

In use, each of the outlet valves 152, 154 and 156 is operable to permit flow of a fluid stream from its input to its output only if a fluid stream is present at its control port. For example, the outlet valve 152 communicates a fluid steam in conduit 130 into the conduit 158 only if a fluid stream is present in the conduit 146. As mentioned above, a fluid stream is present in conduit 146 based on a control signal received by the selection valve 140 from the computer 50. In an embodiment, each outlet valve is a binary valve in that the valve is fully open if a fluid stream is present at its control port and the valve is fully closed if a fluid stream is not present at its control port. In an embodiment, fully open means that the valve does not impede fluid flow from the valve input to the valve output, whereas fully closed means that the valve prevents communication of fluid from the valve input to the valve output.

In an embodiment, each of the outlets 164, 166 and 168 are fixed to the pipeline 4 as described above, for example, using straps. In an embodiment, each of the outlets 164, 166 and 168 are positioned at a different location on the outer surface of the pipeline 4. For example, a distance of several meters or kilometers may exist between adjacent ones of outlets 164, 166 and 168. In this way, each of outlets 164, 166 and 168 may be used to cause a vibration or thermal change in a different portion of the pipeline 4. Stated differently, each of outlets 164, 166 and 168 may be used to simulate a leak in a different portion of the pipeline 4.

Additionally or alternatively, each of outlets 164, 166 and 168 may include a different sized orifice, opening or bore through which a fluid stream communicated to the outlet is output onto the pipeline 4. In this way, different outlets 164, 166 and 168 may output a fluid stream with different pressures. Accordingly, different outlets 164, 166 and 168 may generate different types of vibrations, for example, vibrations with different frequencies or amplitudes. As such, different outlets 164, 166 and 168 may simulate different types or severities of leak. In an embodiment, two or more outlets may be positioned next to each other with no, or minimal, spacing therebetween. In an embodiment, the outlet 12' of system 2' which was removed to make room for the expansion module 128 may be reused as one of the outlets 164, 166 and 168.

In an embodiment, operation of the expansion module 128 may be summarized as follows.

In an embodiment, the computer 50 may issue control signals to the selection valves 140, 142, 144 so as to open or close each valve. In an embodiment, only one of the selection valves 140, 142, 144 may be open and the others may be closed; however, in another embodiment, more than one or all of the selection valves 140, 142, 144 may be open. In any case, for each selection valve which is open, the corresponding outlet valve will permit flow of the fluid stream from the conduit 130 to the outlet associated with the corresponding outlet valve. For example, if selection valve 140 is open, the outlet valve 152 will cause the fluid stream in conduit 130 to be output from the outlet 164. Accordingly, the expansion module 128 provides a mechanism for selectively choosing between a plurality of different outlets so as to generate a vibration or thermal change at a different one of a plurality of locations. Additionally or alternatively, the expansion module 128 provides a mechanism for selectively choosing between a plurality of different outlets so as to generate one of a plurality of different types of vibration.

In the above-described embodiment, the expansion module 128 includes three separate selection paths. For example, one of the selection paths includes selection valve 140, conduit 146, outlet valve 152, conduit 158 and outlet 164. It is to be understood that in some other embodiments, the expansion module 128 may include more or less than three separate selections paths. For example, the expansion module 128 may include one, two, four, five, ten, twenty or one hundred separate selections paths.

In an embodiment, the structure of one or more of the selection paths may be simplified. For example, as an alternative to the above-described structure, each selection path may include a selection unit (not shown) which is communicatively coupled to the computer 50 at a selection terminal (not shown) of the selection unit so as to receive an electronic control signal from the computer 50. Further, the selection unit may include a single valve which is operable to selectively permit or prevent flow of the fluid stream present in conduit 130 to an outlet associated with the selection unit based on the electronic control signal received from the computer 50. In this way, fewer valves may be necessary for each selection path. Also, a separate fluid control signal together with the associated infrastructure may not be necessary.

In the above-described embodiment, the computer 50 has been described as providing electric control signals. However, in some other embodiments, the computer 50 and the other elements of the system 2' may be modified to operate using a different type of control signal, for example, an optical control signal.

In an embodiment, the various elements described above may be provided by the following parts: compressor fluid supply 22 (part California Air Tools 4610); pressure regulator 54 (part Swagelok KLF1BP); fluid heating chamber 58 (BriskHeat thermal jacket); input pressure sensor 100 (General Electric UNIK 5000 pressure transducer); output pressure sensor 106 (General Electric UNIK 5000 pressure transducer); control valve 32 or 32' (Baumann 51000 control valve); shutoff valve 74 (part ASCO EF8314H301-12/DC.); transducer 86 (Fisher DVC6200 positioner); selection valve 134, 136, 138 (part ASCO EF8314H301-12/DC.); outlet valve 152, 160, 162 (Fisher D2 control valve); and, pressure regulator 68 (Fisher regulator #1301F).

It is to be understood that in the above-described embodiments various couplings may be used to connect together the various elements. For example, the end of each conduit may be fitted with a coupling, such as a male threaded coupling. Also, each element connected to a conduit may include a cooperating coupling, such as a female threaded coupling. In this way, the various elements of the systems 2 and 2' may be connected together as described above.

The following describes an outlet 200 for coupling a fluid conduit to a pipeline, in accordance with an embodiment, and with reference to FIGS. 5 to 8. The outlet 200 may be used as the outlet 12 of FIGS. 1 and 2, the outlet 12' of FIG. 3 or the outlets 164, 166 and 168 of FIG. 4.

In an embodiment, the outlet 200 includes a body portion 202. As seen more particularly on FIG. 7, a bore 204 is formed through the body portion 202. The bore 204 has an upstream opening 206 formed in a first surface 208 of the body portion 202. Also, the bore 204 has a downstream opening 210 formed in a second surface 212 of the body portion 202. In an embodiment, the first surface 208 is opposite the second surface 212.

In an embodiment, the outlet 200 includes two grooves 214, 216 formed in the first surface 208 of the body portion 202. The groove 214 is positioned one side of the upstream opening 206 and the groove 216 is positioned an opposing side of the upstream opening 206. As seen more particularly on FIG. 8, in use, the outlet 200 may be fixed to a pipeline 218 by two straps 220 and 222. The straps 220 and 222 may be made of plastic or metal. Each groove 214, 216 is designed to accommodate a different one of straps 220, 222 so that the outlet 200 may be securely fixed in position against the pipeline 218. For example, the strap 220 is located within the groove 214 and the strap 222 is located within the groove 216. In an embodiment, the pipeline 218 may be the above-mentioned pipeline 4 and the straps 220 and 222 may be the above-mentioned straps 18 and 20 or 18' and 20'. In the embodiment of FIGS. 5 to 8, the grooves 214, 216 are positioned away from the ends of the first surface 208, however, in some other embodiments, the grooves 214, 216 may be positioned closer to the ends or closer to the upstream opening 206.

In an embodiment, the outlet 200 may include two protrusions 224, 226 extending from the second surface 212 of the body portion 202. The protrusion 224 is positioned one side of the downstream opening 210, and the protrusion 226 is positioned an opposing side of the downstream opening 210. As seen more particularly on FIG. 8, in use, the protrusions 224, 226 function to stabilize the outlet 200 against a curved outer surface of the pipeline 218, to reduce the chance that the outlet 200 will rock or move on the outer surface of the pipeline 218. The protrusions 224, 226 are shown extending normal to the second surface 212; however, in another embodiment, the protrusions may extend at a different angle to the second surface 212, for example between 70 and 110 degrees.

In the embodiment of FIGS. 5 to 8, the protrusions 224, 226 are positioned at opposing ends of the second surface 212, however, in some other embodiments, the protrusions 224, 226 may not extend at an end portion of the second surface 212 provided that they extend at either side of the downstream opening 210. In an embodiment, at least a portion of the second surface 212 may be curved to improve stability. This may be performed instead of, or in addition to, providing the protrusions 224, 226.

In an embodiment, the bore 204 may include an upstream end portion 230 and a downstream end portion 232. As seen more particularly on FIG. 8, the upstream end portion 230 may be configured in use to couple the outlet 200 to a conduit 234. The conduit 234 may be one of the conduits, 14, 14', 164, 166 and 168 mentioned above with respect to FIGS. 1 to 4. Specifically, the upstream end portion 230 may be internally threaded so as to provide a female socket. Also, the diameter of the upstream end portion 230 may be about 0.25 inches (6.4 mm). In an embodiment, the upstream end portion 230 may meet the National Pipe Thread Taper (NPT) standard for tapered thread used on threaded pipes and fittings. Accordingly, an end of the conduit 234 may be externally threaded so as to engage with the internal thread of the upstream end portion 230.

In an embodiment, the downstream end portion 232 may be sized to provide an orifice through which a fluid stream is output onto the outer surface of the pipeline 218. In an embodiment, the diameter of the downstream end portion may be about 1/32 inches (0.79 mm). As such, a diameter of the upstream portion 230 may be different to the diameter of the downstream portion 232, for example, the downstream diameter may be smaller than the upstream diameter. It is to be understood that the diameter of the upstream and downstream end portions may vary between different embodiments.

In another embodiment, the outlet 200 or a portion thereof may be magnetized so as to improve the connection between the outlet 200 and a ferrous pipeline 218. In one particular example, the outlet 200 may be magnetized, and formed without the grooves 214, 216. As such, the outlet 200 may be fixed to the pipeline 218 by only a force of magnetic attraction. Alternatively, the grooves 214, 216 may still be present, but used only when the outlet 200 is to be fixed to a non-ferrous pipeline 218.

Figure 6:
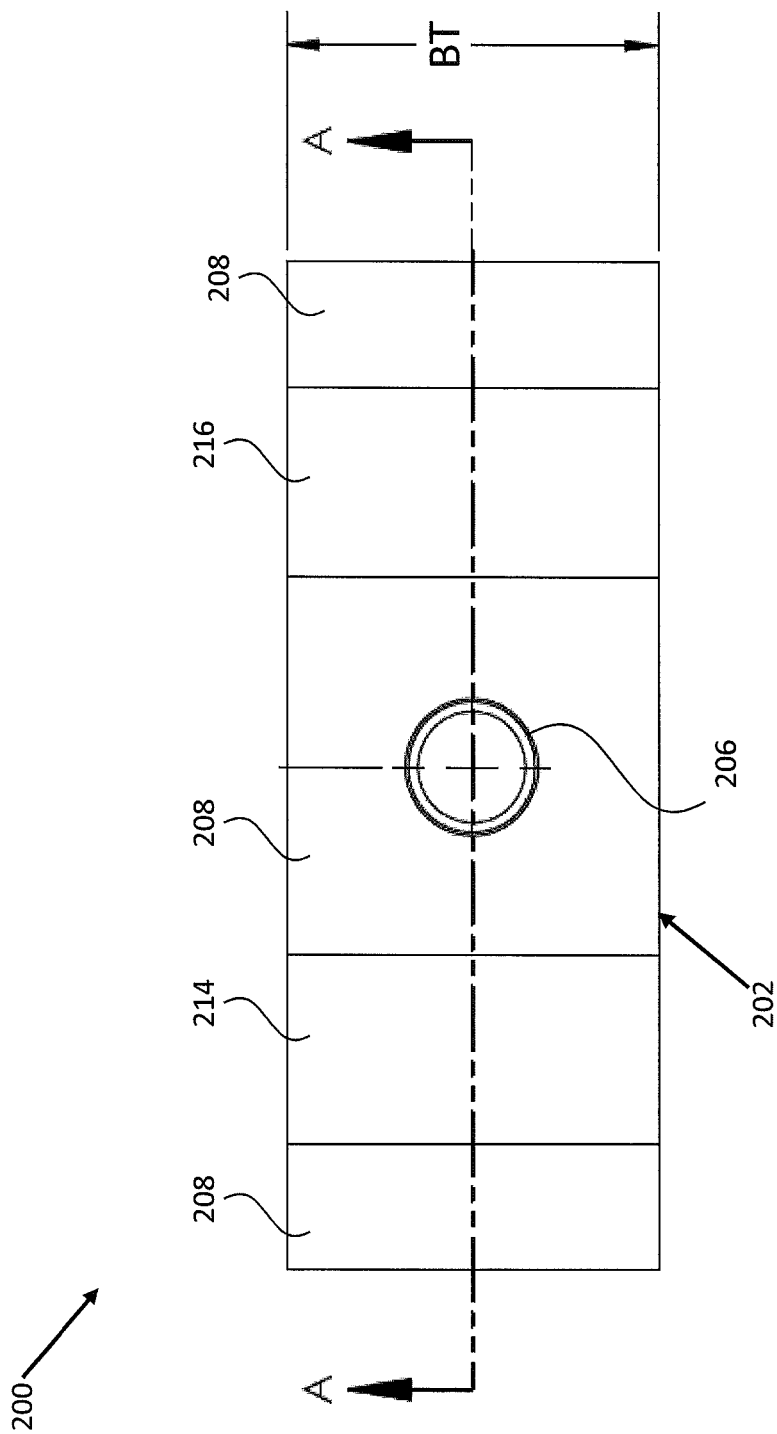
Figure 7:
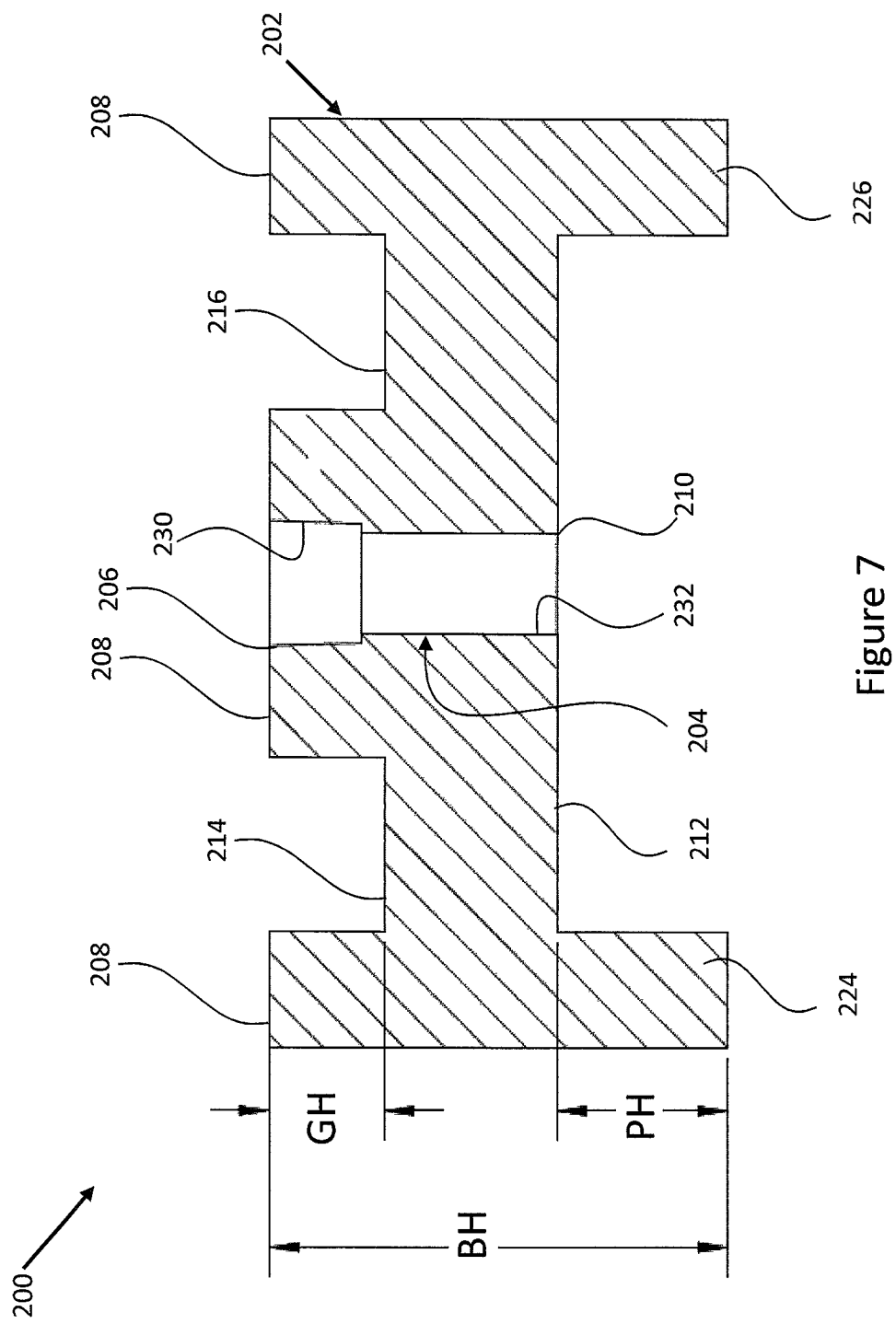
Figure 8:
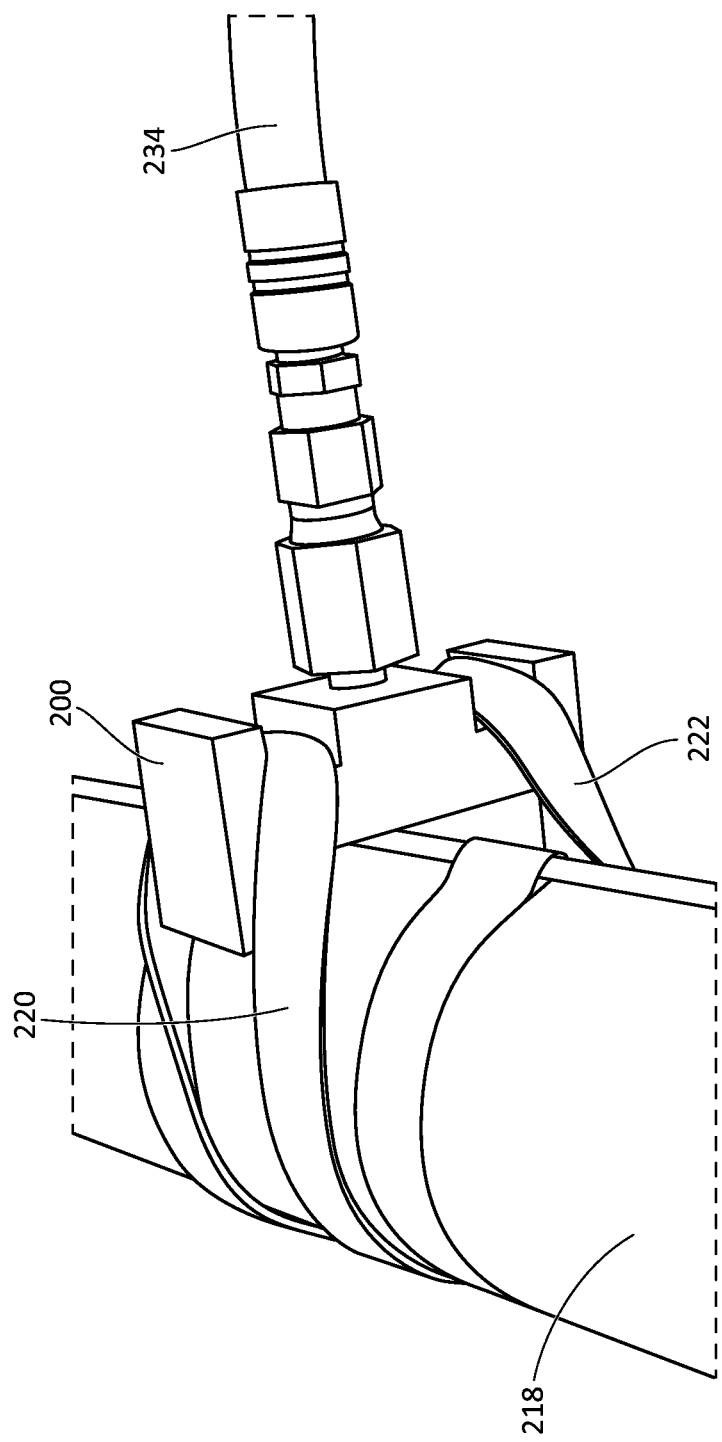
FIG. 8 is a view of the outlet of FIGS. 5 to 7 when fixed to a pipeline.

In an embodiment, example dimensions of the outlet 200 may be as follows. With reference to FIG. 6, the thickness of the body portion 202 (BT) is about 1.5 inches (about 38 mm). With reference to FIG. 7, the height of the body portion 202 (BH) is about 2 inches (about 51 mm); the height of the grooves 214 and 216 (GH) is about 0.5 inches (about 13 mm); and, the height of the protrusions 224 and 226 (PH) is about 0.75 inches (about 19 mm). In an embodiment, the outlet 200 may be made of metal, for example, steel or aluminum. It is to be understood that in some other embodiments, one or more of these example dimensions may be varied.

In an embodiment, the outlet 200 may be made from a non-metallic material, such as, for example, plastic or wood. Such embodiments may be beneficial in scenarios in which there is a concern for cathodic protection of the pipeline 4.

Figure 9:
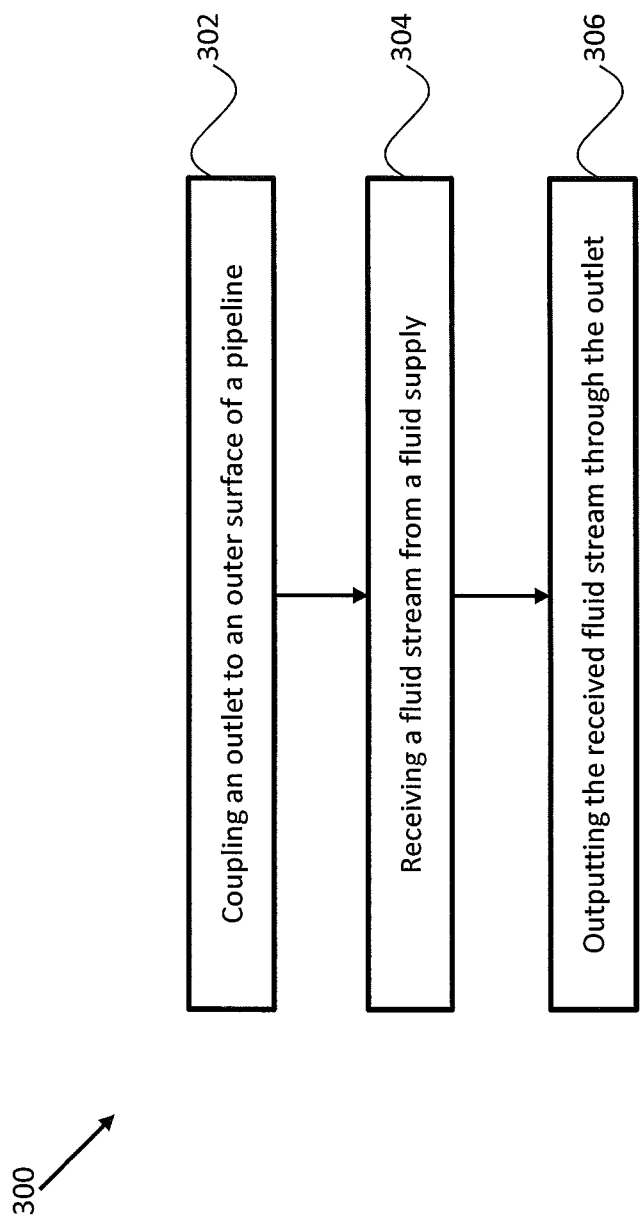
FIG. 9 is a flow diagram of a method for simulating a leak in a pipeline in accordance with an embodiment.

The following describes a method for simulating a leak in a pipeline, in accordance with an embodiment, and with reference to a flow diagram 300 of FIG. 9. The method may be performed using the system 2 of FIGS. 1 and 2, the system 2' of FIG. 3, the system 2' including the expansion module 128 of FIG. 4, and/or the outlet 200 of FIGS. 5 to 8.

In an embodiment, at block 302, an outlet is coupled to an outer surface of a pipeline. For example, the process of coupling may include securing the outlet to the pipeline using one or more straps. Additionally or alternatively, the outlet may be magnetic and the pipeline may be ferrous, and a force of magnetic attraction may fix the outlet to the pipeline.

In an embodiment, at block 304, a fluid stream is received from a fluid supply. For example, a fluid stream may be received from a fluid store, such as a tank. In an embodiment, the tank may contain nitrogen and may provide a stream of nitrogen gas as the fluid stream. Nitrogen may be a desirable substance if the pipeline contains a flammable or explosive material, such as a natural gas like methane. In another embodiment a different type of gas may be provided as the fluid stream, such as oxygen gas or air. In a further example, the fluid stream may include a liquid, such as water. In any case, the method may further include generating the fluid stream. For example, a fluid stream may be generated by compressing air using a compressor. As such, the fluid supply may be a storage tank or a compressor.

In an embodiment, at block 306, the fluid stream received in block 304 is output through the outlet which was fixed to the pipeline in block 302. The fluid stream may be output such that the fluid stream hits the outer surface of the pipeline at a location opposite the outlet. In this way, a vibration is caused in the pipeline which mimics the vibration caused by a leak in the pipeline. Additionally, the act of the fluid stream hitting the outer surface of the pipeline may cause a thermal change inside the pipeline. This thermal change may be detected by a leak detection system installed in the pipeline. Therefore, the method may also generate a thermal change in the pipeline which mimics a thermal change caused by a leak in the pipeline. For example, the fluid stream output from a nitrogen tank or a compressor may be at a lower temperature than the pipeline and the substance transported by the pipeline. Accordingly, outputting the fluid stream on to the pipeline may cause a drop in the temperature of the pipeline. This drop in temperature may mimic the thermal change caused by a leak in the pipeline.

In an embodiment, a pressure of the received fluid stream output through the outlet is varied. In this way, a type of vibration caused in the pipeline by the fluid stream may be varied. Accordingly, the method may provide a variable output which can be adjusted to simulate different types of leaks.

In an embodiment, the method includes determining a flow rate of the fluid stream output through the outlet in block 306, and generating an alarm based on the determined flow rate. In this way, an alarm signal can be generated if the method is malfunctioning such that an operator believes that a fluid stream is incident on the pipeline when in fact it is not, for example, due to a malfunction of some equipment such as the fluid supply. As such, the alarm may be generated only if the determined flow rate is below a threshold flow rate. In an embodiment, the threshold flow rate may be zero $m^3 \, s^{-1}$.

In an embodiment, the fluid stream may be heated to a preset temperature before it is output in block 306. In the example mentioned above, a temperature change was generated because the fluid stream cooled the pipeline. However, in another example, a temperature change could be generated because the fluid stream heats the pipeline. In another embodiment, the fluid stream may be heated to the same temperature as the substance being carried or transported by the pipeline. Accordingly, the impact of the fluid stream on the pipeline may more accurately model the leaking of the substance from the pipeline. Therefore, the vibration caused by the fluid stream may more accurately mimic the vibration caused by the substance leaking from the pipeline.

In an embodiment, a plurality of different outlets may be coupled at different locations on the outer surface of the pipeline. Next, one of the plurality of different outlets may then be selected as the outlet through which the received fluid stream is output in block 306. For example, an expansion module 128 as described above with reference to FIG. 4 may be used. In another embodiment, at least two of the plurality of different outlets may be selected and the fluid stream received in block 304 may be simultaneously output through the selected at least two outlets. In this way, the fluid stream hits the outer surface of the pipeline at locations opposite each of the at least two selected outlets such that multiple separate vibrations are caused in the pipeline. Accordingly, multiple leaks may be simultaneously simulated in the pipeline.

According to the above-described embodiments, interested parties may simulate a leak in a pipeline to confirm that a pipeline leak detection system installed in the pipeline is working correctly and is calibrated correctly. Interested parties may include: pipeline owners, pipeline regulators, and persons through who's land a pipeline travels. In this way, such interested parties may be able to test the operation of the leak detection system independently of the leak detection system operators.

The above-described embodiments can provide an in-situ leak simulation system. The system can be permanently or temporarily fitted to a pipeline and left attached to the pipeline until such time that it is to be used. The system can be used both pre and post deployment of the pipeline into its resting place. Also, the system can be used on a regular basis during the lifetime of the pipeline.

The above-described embodiments provide a non-invasive means by which to simulate a leak in a pipeline. For example, use of the system does not cause any disruption to the use of the pipeline for its primary purpose, that is, carrying or transporting various substances. Stated differently, there is no need to shut down the pipeline or alter the flow rate in order to simulate a leak to test a leak detection system. Also, the system does not cause damage to the pipeline when installed or used.

The above-described embodiments can be portable because the components are relatively small and so can be housed in a housing which can be transported by hand or by truck. In this way, various embodiments can be relocated to different locations along the path of the pipeline.

In an embodiment, data reporting on the operation of the system can be integrated into the overall pipeline reporting infrastructure. For example, the amount of fluid which flows out of the outlet 12' during the simulation and its pressure can be reported along with the acoustic, strain and/or thermal signatures detected by the leak detection system.

In the above-described embodiments, an outlet is coupled to an outer surface of the pipeline. In this way, a fluid stream output from the outlet hits an outer surface of the pipeline at a location opposite the outlet such that a vibration is caused in the pipeline. However, it is to be understood that in some other embodiments, the outlet may not be coupled or fixed to the pipeline. This is, the outlet may be positioned close to the pipeline, but not directly affixed to the pipeline. In one such example, the outlet may be directly affixed to an intermediate element. The intermediate element may or may not be affixed to the pipeline. In an embodiment, the intermediate element may be a bracket, frame, support or the like. Where the intermediate element is not affixed to the pipeline, it may nevertheless be positioned close to the outer surface of the pipeline, for example, with a spacing of less than one meter. In another such example, the outlet may not be directly affixed to the pipeline or an intermediate element. Instead, the outlet may simply be positioned close to the pipeline such that a fluid stream output from the outlet hits an outer surface of the pipeline. For example, the outlet may rest on the ground beneath the pipeline and may be orientated such that fluid output from the outlet hits the outer surface of the pipeline.

FIG. 10 is a block diagram of an illustrative computer system 400 which may be used in an embodiment as the computer 50 of FIG. 3 or the controller 34 of FIGS. 1 and 2. The computer system 400 comprises a display 402, input devices in the form of a keyboard 404a and a pointing device 404b, a computer 406, and external devices 408. While the pointing device 404b is depicted as a mouse, other types of pointing devices may also be used. In alternative embodiments (not depicted), the computer system 400 may not comprise all the components depicted in FIG. 10. For example, the computer system 400 may lack the display 402, keyboard 404a, and mouse 404b.

The computer 406 may comprise one or more processors or microprocessors, such as a central processing unit (CPU) 410, which is depicted. The CPU 410 performs arithmetic calculations and control functions to execute software stored in an internal memory 412, such as one or both of random access memory (RAM) and read only memory (ROM), and possibly additional memory 414. The additional memory 414 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 10, or both.

The computer system 400 may also comprise other similar means for allowing computer programs or other instructions to be loaded. Such means can comprise, for example, a communications interface 416 that allows software and data to be transferred between the computer system 400 and external systems and networks. Examples of the communications interface 416 comprise a modem, a network interface such as an Ethernet card, a wireless communication interface, or a serial or parallel communications port. Software and data transferred via the communications interface 416 are in the form of signals which can be electronic, acoustic, electromagnetic, optical, or other signals capable of being received by the communications interface 416. Multiple interfaces, of course, can be provided on the computer system 400. In this way, the computer system 400 is able to receive the above-mentioned communication signals from remote devices. As such, the communications interface 416 may provide a wireless communication module in accordance with an embodiment.

Input to and output from the computer 406 is administered by the input/output (I/O) interface 418. The I/O interface 418 administers control of the display 402, keyboard 404a, external devices 408 and other analogous components of the computer system 400. The computer 406 also comprises a graphical processing unit (GPU) 420. The GPU 420 may also be used for computational purposes as an adjunct to, or instead of, the CPU 410, for mathematical calculations. However, as mentioned above, in alternative embodiments (not depicted) the computer system 400 need not comprise all of these elements. For example, the display 402, keyboard 404a, mouse 404b, and GPU 420 may be omitted. In an embodiment, the communications interface 416 and/or the I/O interface 418 may provide the computer system 400 with a means for sending control signals to various elements of the systems 2 and 2' and receiving measurements therefrom.

The various components of the computer system 400 are coupled to one another either directly or indirectly by shared coupling to one or more suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

It is contemplated that any part of any aspect or embodiment discussed in this specification can be implemented or combined with any part of any other aspect or embodiment discussed in this specification.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One or more currently example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method of simulating a leak in a pipeline, the method comprising:
(a) receiving a fluid stream from a fluid supply; and
(b) outputting the received fluid stream through an outlet such that the received fluid stream hits an outer surface of the pipeline at a location opposite the outlet such that a vibration is caused in the pipeline.

2. The method of claim 1, further comprising coupling the outlet to the outer surface of the pipeline prior to outputting the received fluid stream through the outlet.

3. The method of claim 2, further comprising varying a pressure of the received fluid stream output through the outlet.

4. The method of claim 2, further comprising:
determining a flow rate of the received fluid stream output through the outlet; and
generating an alarm based on the determined flow rate.

5. The method of claim 4, wherein the alarm is generated only if the determined flow rate is below a threshold flow rate.

6. The method of claim 1, further comprising heating or cooling the received fluid stream to a preset temperature before outputting the received fluid stream through the outlet.

7. The method of claim 6, wherein the preset temperature is the temperature of a substance being transported inside the pipeline.

8. The method of claim 2, further comprising:
coupling a plurality of different outlets at different locations on the outer surface of the pipeline; and
selecting one of the plurality of different outlets as the outlet through which the received fluid stream is output.

9. The method of claim 8, further comprising:
selecting at least two of the plurality of different outlets; and,
simultaneously outputting the received fluid stream through the selected at least two outlets such that the received fluid stream hits the outer surface of the pipeline at locations opposite each of the at least two selected outlets such that multiple separate vibrations are caused in the pipeline.

10. A system for simulating a leak in a pipeline, the system comprising:
a pipeline;
a fluid supply operable to generate a fluid stream;
an inlet in fluid communication with the fluid supply so as to receive the fluid stream therefrom;
a control valve having a valve input, a valve output and a control port, the valve input being in fluid communication with the inlet so as to receive the fluid stream therefrom, the control valve being operable to selectively permit or prevent communication of the fluid stream from the valve input to the valve output based on a control signal received at the control port;
a controller communicatively coupled to the control port and operable to provide the control signal to the control port;
an outlet in fluid communication with the valve output, the outlet being fixed to the pipeline such that, when the control valve permits communication of the fluid stream from the valve input to the valve output, the fluid stream is output onto an outer surface of the pipeline such that a vibration is caused in the pipeline.

11. The system of claim 10, wherein the control valve is operable to vary an amount of the fluid stream which is permitted to communicate from the valve input to the valve output based on the control signal received at the control port.

12. The system of claim 11, wherein the controller comprises:
a computer operable to generate an electronic control signal;

a transducer having a transducer input, a transducer output and a control terminal, the control terminal being communicatively coupled to the computer so as to receive the electronic control signal therefrom, the transducer input being in fluid communication with the inlet so as to receive the fluid stream therefrom, the transducer being operable to vary a pressure of the fluid stream received at the transducer input based on the electronic control signal received at the control terminal to generate a fluid control signal and to output the fluid control signal from the transducer output; and wherein the control port is in fluid communication with the transducer output, and wherein the control valve is operable to vary the amount of the fluid stream which is permitted to communicate from the valve input to the valve output based on a variation in pressure of the fluid control signal received at the control port.

13. The system of claim 12, wherein the controller further comprises:

a shutoff valve having a shutoff terminal communicatively coupled to the computer, the shutoff valve being in fluid communication with the transducer input and operable to selectively permit or prevent flow of the fluid stream to the transducer input based on an electronic control signal received at the shutoff terminal from the computer to selectively permit or prevent output of the fluid control signal from the transducer output, and wherein the control valve is operable to prevent communication of the fluid stream from the valve input to the valve output when the fluid control signal is absent at the control port.

14. The system of claim 12, further comprising a first fluid pressure regulator in fluid communication with the inlet and the valve input, the first fluid pressure regulator being operable to limit a maximum pressure of the fluid stream received at the valve input.

15. The system of claim 12, further comprising a second fluid pressure regulator in fluid communication with the inlet and the transducer input, the second fluid pressure regulator being operable to limit a maximum pressure of the fluid stream received at the transducer input.

16. The system of claim 12, further comprising an input fluid pressure sensor communicatively coupled to the computer, the input fluid pressure sensor being in fluid communication with the inlet and the valve input, the input fluid pressure sensor being operable to measure a pressure of the fluid stream received at the valve input to generate an input pressure measurement and being further operable to supply the input pressure measurement to the computer.

17. The system of claim 16, further comprising an output fluid pressure sensor communicatively coupled to the computer, the output fluid pressure sensor being in fluid communication with the valve output and the outlet, the output fluid pressure sensor being operable to measure a pressure of the fluid stream output from the valve output to generate an output pressure measurement and being further operable to supply the output pressure measurement to the computer.

18. The system of claim 17, wherein the computer is operable to vary the electronic control signal supplied to the control terminal based on the input pressure measurement and the output pressure measurement to cause the control valve to vary an amount of the fluid stream which is permitted to communicate from the valve input to the valve output such that the output pressure measurement is maintained at a preset value.

19. The system of claim 12, further comprising a fluid flow meter communicatively coupled to the computer, the fluid flow meter being in fluid communication with the valve output and the outlet, the fluid flow meter being operable to measure a flow rate of the fluid stream output from the valve output to generate an output flow measurement and being further operable to supply the output flow measurement to the computer; and wherein the computer is operable to generate an alarm signal based on the output flow measurement.

20. The system of claim 12, further comprising a fluid heating chamber communicatively coupled to the computer, the fluid heating chamber being in fluid communication with the inlet and the valve input;

wherein the computer is operable to provide a heating control signal to the fluid heating chamber; and wherein the fluid heating chamber is operable to heat the fluid stream received at the valve input to a preset temperature based on the heating control signal received from the computer.

21. The system of claim 12, further comprising a compressor in fluid communication with the inlet and communicatively coupled to the computer, wherein the computer is operable to provide a fluid generation control signal to the compressor; and wherein the compressor is operable to generate the fluid stream received by the inlet by compressing ambient air, based on the fluid generation control signal received from the computer.

22. The system of claim 12, wherein the computer comprises a wireless communication module operable to receive a communication signal from a remote device, the computer being operable to generate control signals based on the communication signal.

23. The system of claim 12, further comprising a selection unit having a selection terminal communicatively coupled to the computer and an outlet valve in fluid communication with the valve output and the outlet;

wherein the computer is operable to provide a selection control signal to the selection unit; and wherein the selection unit is operable to control the outlet valve to selectively permit or prevent flow of the fluid stream output from the valve output to the outlet based on the selection control signal received at the selection terminal from the computer.

\* \* \* \* \*